United States Patent
Piekniewski et al.

(10) Patent No.: US 9,436,908 B2
(45) Date of Patent: Sep. 6, 2016

(54) APPARATUS AND METHODS FOR RATE-MODULATED PLASTICITY IN A NEURON NETWORK

(71) Applicant: QUALCOMM TECHNOLOGIES INC., San Diego, CA (US)

(72) Inventors: Filip Piekniewski, San Diego, CA (US); Micah Richert, San Diego, CA (US); Eugene Izhikevich, San Diego, CA (US); Victor Hokkiu Chan, Del Mar, CA (US); Jeffrey Alexander Levin, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 240 days.

(21) Appl. No.: 13/774,934

(22) Filed: Feb. 22, 2013

(65) Prior Publication Data

US 2014/0244557 A1    Aug. 28, 2014

(51) Int. Cl.
  *G06N 3/08* (2006.01)
  *G06N 3/02* (2006.01)
  *G06N 99/00* (2010.01)
  *G06N 3/04* (2006.01)
  *G06N 3/10* (2006.01)

(52) U.S. Cl.
  CPC *G06N 3/08* (2013.01); *G06N 3/02* (2013.01); *G06N 3/049* (2013.01); *G06N 3/10* (2013.01); *G06N 99/005* (2013.01)

(58) Field of Classification Search
  None
  See application file for complete search history.

(56) References Cited

U.S. PATENT DOCUMENTS

2005/0261803 A1* 11/2005 Seth et al. ............... 700/245
2014/0310220 A1* 10/2014 Chang et al. ............ 706/25

OTHER PUBLICATIONS

Dan, Yang et al, "Spike Timing-Dependent Plasticity of Neural Circuits", Neuron 2004.*
Natalia, et. al., Spike Timing-Dependent Plasticity: A Hebbian Learning Rule, Annual Review of Neuroscience, 2008.*
Oja, Erkki (2008), Scholarpedia "Oja learning rule.".*
Markram, Henry et al, "Regulation of Synaptic Efficacy by Coincidence of Postsynaptic APs and EPSPs", Science 1997.*
Steele, "Inhibitory Control of LTP and LTD: Stability of Synapse Strength" Journal of Neurophysiology, 1999.*
Blais "BCM Theory" Scholarpedia, 2008.*
Sjostrom "Spike-timing Dependent Plasticity" Scholarpedia, 2010.*

* cited by examiner

*Primary Examiner* — Kakali Chaki
*Assistant Examiner* — Eric Nilsson
(74) *Attorney, Agent, or Firm* — Seyfarth Shaw LLP

(57) ABSTRACT

Apparatus and methods for activity based plasticity in a spiking neuron network adapted to process sensory input. In one approach, the plasticity mechanism of a connection may comprise a causal potentiation portion and an anti-causal portion. The anti-causal portion, corresponding to the input into a neuron occurring after the neuron response, may be configured based on the prior activity of the neuron. When the neuron is in low activity state, the connection, when active, may be potentiated by a base amount. When the neuron activity increases due to another input, the efficacy of the connection, if active, may be reduced proportionally to the neuron activity. Such functionality may enable the network to maintain strong, albeit inactive, connections available for use for extended intervals.

24 Claims, 16 Drawing Sheets

APPARATUS AND METHODS FOR RATE-MODULATED PLASTICITY IN A NEURON NETWORK

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, co-owned U.S. patent application Ser. No. 13/465,918, entitled "SPIKING NEURAL NETWORK OBJECT RECOGNITION APPARATUS AND METHODS", filed May 7, 2012, co-owned U.S. patent application Ser. No. 13/488,106, entitled "SPIKING NEURON NETWORK APPARATUS AND METHODS", filed Jun. 4, 2012, co-owned U.S. patent application Ser. No. 13/488,144, entitled "SPIKING NEURON NETWORK APPARATUS AND METHODS", filed Jun. 4, 2012, co-owned U.S. patent application Ser. No. 13/541,531, entitled "CONDITIONAL PLASTICITY SPIKING NEURON NETWORK APPARATUS AND METHODS", filed Jul. 3, 2012, U.S. patent application Ser. No. 13/548,071, entitled "SPIKING NEURON NETWORK SENSORY PROCESSING APPARATUS AND METHODS", filed Jul. 12, 2012, co-owned U.S. patent application Ser. No. 13/660,923, entitled "ADAPTIVE PLASTICITY APPARATUS AND METHODS FOR SPIKING NEURON NETWORK", Oct. 25, 2012, co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, co-owned U.S. patent application Ser. No. 13/660,982, entitled "SPIKING NEURON SENSORY PROCESSING APPARATUS AND METHODS FOR SALIENCY DETECTION", filed Oct. 25, 2012, co-owned U.S. patent application Ser. No. 13/660,945, entitled "MODULATED PLASTICITY APPARATUS AND METHODS FOR SPIKING NEURON NETWORKS", filed Oct. 25, 2012, co-owned U.S. patent application Ser. No. 13/691,554, entitled "RATE STABILIZATION THROUGH PLASTICITY IN SPIKING NEURON NETWORK", filed Nov. 30, 2012, and co-owned U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to artificial neural networks, and more particularly in one exemplary aspect to computer apparatus and methods for plasticity implementation in a pulse-code neural network.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011, the foregoing being incorporated herein by reference in its entirety, and U.S. patent application Ser. No. 13/152,119, Jun. 2, 2011, entitled "SENSORY INPUT PROCESSING APPARATUS AND METHODS", incorporated supra.

Typically, artificial spiking neural networks, such as the exemplary network described in owned U.S. patent application Ser. No. 13/541,531, entitled "CONDITIONAL PLASTICITY SPIKING NEURON NETWORK APPARATUS AND METHODS", incorporated supra, may comprise a plurality of units (or nodes), which can be thought of as corresponding to neurons in a biological neural network. Any given unit may be connected to many other units via connections, also referred to as communications channels, and/or synaptic connections. The units providing inputs to any given unit are commonly referred to as the pre-synaptic units, while the units receiving the inputs are referred to as the post-synaptic units.

Individual ones of the unit-to-unit connections may be assigned, inter cilia, a connection efficacy, which in general may refer to a magnitude and/or probability of input spike influence on unit output response (i.e., output spike generation/firing). The efficacy may comprise, for example a parameter (e.g., synaptic weight) by which one or more state variables of post-synaptic unit are changed. The efficacy may comprise a latency parameter by characterizing propagation delay from a pre-synaptic unit to a post-synaptic unit. In some implementations, greater efficacy may correspond to a shorter latency.

Some existing implementations of temporal learning (e.g., slow feature analysis) by spiking neural networks via spike timing dependent plasticity and/or increased excitability may develop diminished responsiveness ('forget') features that did not appear for an extended period of time (e.g., 10 minutes or longer for a 25 frames per second (fps) visual stimulus input).

Previously strong but presently inactive input synapses may become depressed based on the activity of the post synaptic neuron. This configuration may lead (especially in multi-layer processing networks) to unstable input synaptic sets and/or receptive fields.

Accordingly, there is a salient need for improved network operation capable of, inter alia, responding efficiently to stimuli that may appear at long intervals between one another.

SUMMARY OF THE DISCLOSURE

The present disclosure satisfies the foregoing needs by providing, inter alia, apparatus and methods for implementing activity based plasticity in spiking neuron networks that is capable of, inter alia, responding efficiently to infrequently appearing stimuli.

In a first aspect, a non-transitory computerized spiking neuron apparatus comprising a plurality of computer-readable instructions is disclosed. In an implementation, when executed, the instructions are configured to, based on a response by the neuron, (i) increase an efficacy of a connection configured to provide input to the neuron prior to the response, and (ii) adjust the efficacy of a connection configured to provide input to the neuron subsequent to the response.

In some implementations, the adjustment of the efficacy is determined based on a rate of the response.

In a second aspect, a sensory processing spiking neuron network apparatus is disclosed. In one exemplary implementation, the apparatus includes a connection configured to provide an input to the neuron configured to generate a response based on the input.

In various implementations, the connection is further configured to be: (i) potentiated when the input is within an interval from the response, and (ii) adjusted when the input occurs subsequent to the response, the adjustment being determined based on activity of the neuron prior to the response.

In a third aspect, a non-transitory computer-readable storage apparatus having instructions embodied thereon is disclosed. In one implementation, when executed, the instructions are configured to, inter alia, update a connection configured to provide stimulus to an artificial spiking neuron.

In one or more implementations, the update is configured to: (i) potentiate the connection if the stimulus precedes a response generated by the neuron, and (ii) if the response precedes the stimulus: (a) potentiate the connection if neuron activity is below a threshold level, and (b) depress the connection if the neuron activity is above the threshold level.

In a fourth aspect, a method of managing a connection in a spiking neuron network based on at least one signal from a neuron is disclosed. In an exemplary implementation, the method includes: (i) receiving at least one input via the connection, (ii) sending the at least one signal at a time proximate to the received at least one input, (iii) if the at least one signal is sent prior to the reception of the input, demoting the connection, and (iv) if the at least one signal is sent after the reception of the input, promoting the connection.

In a fifth aspect, a discreet apparatus configured to manage response to stimuli in a neuron network is disclosed. In various implementations, the apparatus comprises a network element configured to temporally correlate feedback.

In a sixth aspect, a method of sensory processing via one or more rate modulated mechanisms is disclosed.

Further features of the present disclosure, its nature and various advantages will be more apparent from the accompanying drawings and the following detailed description.

Figure 1:
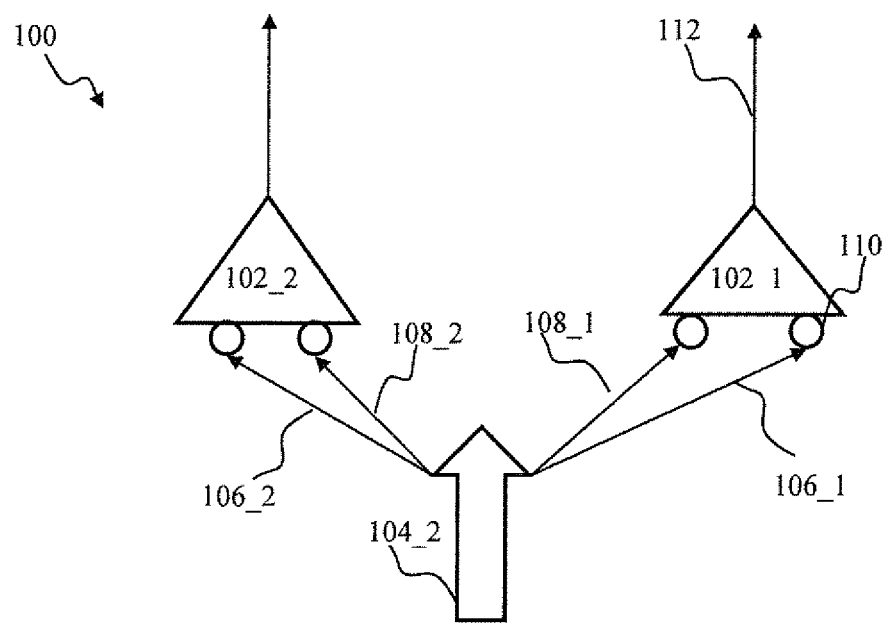
FIG. 1 is a graphical illustration depicting an artificial spiking neural network configured for implementing activity modulated plasticity, according to one or more implementations.

All Figures disclosed herein are © Copyright 2013 Brain Corporation. All rights reserved.

DETAILED DESCRIPTION

Exemplary embodiments and implementations of the various aspects of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these embodiments or implementations can be partially or fully implemented using known components, only those portions of such known components that are necessary for an understanding of the present disclosure will be described, and detailed descriptions of other portions of such known components will be omitted so as not to obscure the innovation.

In the present specification, an embodiment or implementations showing a singular component should not be considered limiting; rather, the disclosure is intended to encompass other embodiments or implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDRJ2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, in one salient aspect, apparatus and methods for implementing activity-based plasticity mechanisms in spiking neuron networks configured to, inter alia, to improve network response to input stimuli comprising a variety of features.

In some implementations, a neuron may respond to different aspects of the input that may be separated by period of inactivity (e.g., a pause in the input). By way of non-limiting illustration, a neuron may respond to an aspect (e.g., a color and/or model) of a car in the video input. An object such as the car may initially appear in the input, may not be subsequently present in the input for several seconds. The plasticity methodology described herein may enable maintaining strong, but inactive connections of a neuron, for extended periods of time while providing for neuron response selectivity.

Implementations of the foregoing functionality of the present disclosure may be useful in a variety of applications, including for instance a prosthetic device, autonomous robotic apparatus, and other electromechanical devices requiring visual or other sensory data processing functionality.

Detailed descriptions of the various embodiments and implementations of the apparatus and methods of the disclosure are now provided. Although certain aspects of the disclosure can best be understood in the context of the sensory (e.g., visual) information processing using pulse-code neural networks, the disclosure is not so limited, and implementations of the disclosure may also be used in a wide variety of other applications, including for instance in implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

FIG. 1 illustrates a spiking neuronal network 100, configured to process sensory input, in accordance with one or more implementations. The sensory input (the input 104 in FIG. 1) may comprise, for example, an audio signal, a stream of video frames, and/or other input. In some implementations, the input stimulus 104 may comprise image frames received from an image sensor (such as a CCD or a CMOS sensor device). In one or more implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing network of FIG. 1, or yet other configurations.

The network 100 of FIG. 1 may comprise one (or more layers) of neurons (units) (depicted by triangles 102 in FIG. 1). The units 102 of one layer may receive sensory input 104 as feed-forward stimulus. Individual neurons 102 may be characterized by receptive fields. In one or more implementations of visual stimulus possessing, the receptive fields may describe sensitivity of a neuron to the stimulus as a function of a location of an object/feature (associated with the stimulus) within a frame (e.g., a horizontal and/or a vertical coordinate). Receptive fields with various spatial sensitivity such as for example, Gaussian, box cart, triangular, raised cosine and/or other dependencies, may be utilized when encoding sensory input.

In some implementations, the spiking neuron networks may employ an inhibition mechanism in order to increase competition between neurons and to produce a variety of receptive fields responding to individual objects, such as those described in detail in U.S. patent application Ser. No. 13/152,105, entitled "APPARATUS AND METHODS FOR TEMPORALLY PROXIMATE OBJECT RECOGNITION", filed Jun. 2, 2011, which is incorporated herein by reference in its entirety.

A wide variety of competition mechanisms may be applied in conjunction with the learning principles discussed herein. For example, one approach, commonly referred to as "winner take all" (WTA), may allow a single detector (for example neuron 135 of FIG. 1) to report detection of the specific object. This is achieved by, inter alia, sending of a control (inhibition) signal from the detector (the neuron node that is the first to detect the object) to other detectors to delay and/or prevent detection signal generation by the other detectors.

Returning now to FIG. 1, a portion of the sensor), input 104 may be provided to individual neurons 102 via one or more feed-forward connections 106, 108 (e.g., connections 106_1, 106_2 providing one portion of the input to the neurons 102_1, 102_2, respectively and connections 108_1, 108_2 providing another portion of the input to the neurons 102_1, 102_2, respectively). Individual connections 106, 108 may be characterized by connection efficacy, denoted by open circles 108 in FIG. 1. In some implementations, connection efficacy may be used to describe a magnitude, and/or a probability of influence of pre-synaptic spike (e.g., the input 104 in FIG. 1) on response generation by a post-synaptic neuron (e.g., 102 in FIG. 1). In one or more implementations, connection efficacy may comprise for example a parameter such as synaptic weight, by which one or more state variables of the post-synaptic neuron(s) may be changed.

Individual neurons 102 may be operated in accordance with a neuron dynamic process that may be characterized by a neuronal state parameter. In some implementations, the state parameter may comprise neuron excitability, neuron membrane potential, and/or one or more other parameters. The dynamic process may comprise a stochastic process, such as for example those described in co-owned and co-pending U.S. patent application Ser. No. 13/487,533, entitled "STOCHASTIC SPIKING NETWORK LEARNING APPARATUS AND METHODS" filed Jun. 4, 2012, incorporated herein by reference in its entirety.

The neurons 102 may generate responses based on the input 104 delivered via the one or more connections 106, 108. In some implementations, the response may be generated in accordance with a deterministic spike response model, such as for example described in U.S. patent application Ser. No. 13/152,119, entitled "APPARATUS AND METHODS FOR TEMPORALLY PROXIMATE OBJECT RECOGNITION", filed on Jun. 2, 2011, incorporated supra. The spike response process may comprise an adaptive threshold adjustment, such as e.g., described in U.S. patent application Ser. No. 13/623,820, entitled "APPARATUS AND METHODS FOR ENCODING OF SENSORY DATA USING ARTIFICIAL SPIKING NEURONS", filed on Sep.

20, 2012 incorporated herein by reference in its entirety. The neurons 102 may be operable in accordance with stochastic process, such as for example that those described in U.S. patent application Ser. No. 13/487,499, entitled "STOCHASTIC APPARATUS AND METHODS FOR IMPLEMENTING GENERALIZED LEARNING RULES", filed on Jun. 4, 2012, incorporated herein by reference in its entirety. Response generation in a stochastic neuron may be characterized by a probability of response generation.

The responses of the neurons 102 may be communicated via feed-forward connections 112, for subsequent processing by other parts of the network. In some implementations, such processing may comprise detection of higher-order features (e.g., corners), objects (e.g., rectangles), and/or other applications. Typically, the feed-forward stimulus 104 may cause an increase of a probability of the response by the neuron 102.

The network 100, may be operated in accordance with activity-dependent plasticity mechanism described in detail with respect to FIGS. 2A-4C below.

Figure 2A:
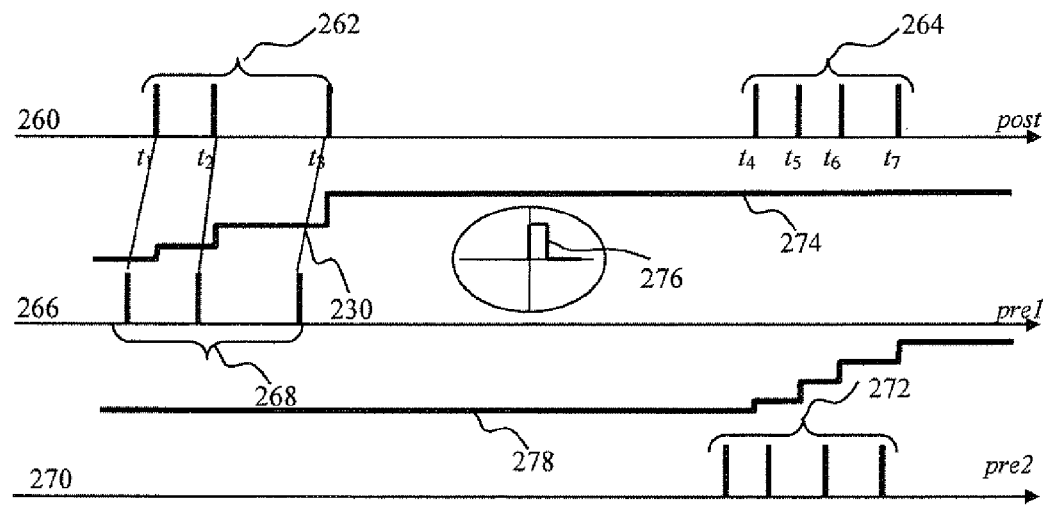
FIG. 2A is a plot illustrating connection potentiation via an activity modulated plasticity mechanism, according to one or more implementations.
Figure 2B:
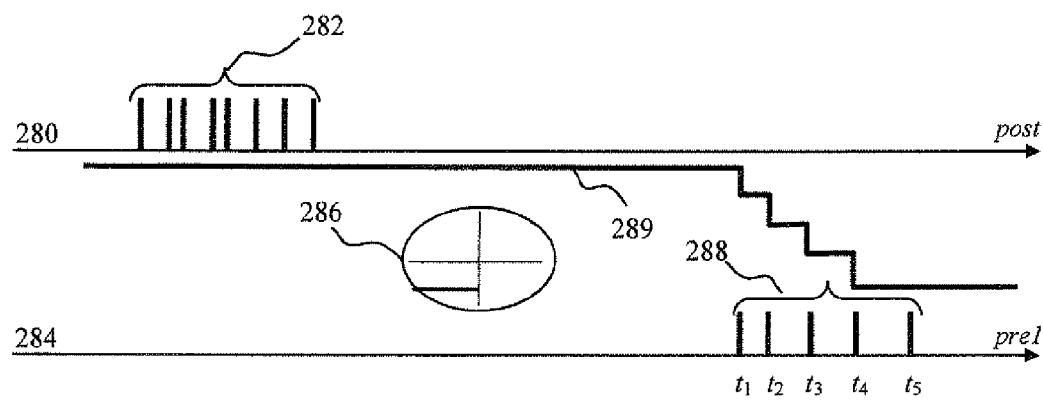
FIG. 2B is a plot illustrating connection depression via an activity modulated plasticity mechanism, according to one or more implementations.
Figure 2C:
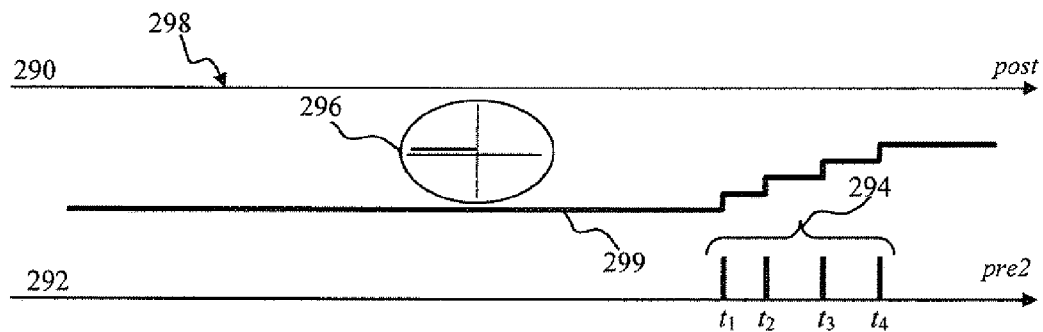
FIG. 2C is a plot illustrating adjusting efficacy a network connection configure to provide, inter cilia, input via an activity modulated plasticity mechanism, according to one or more implementations.

FIGS. 2A-2C illustrate the use of plasticity rules of the disclosure (e.g., the rule 340 of FIG. 340 of FIG. 3B) for modifying efficacy of a connection (e.g., the connection 106_1 in FIG. 1). In FIG. 2A, the trace 260 depicts post-synaptic unit activity (e.g., 102_1 in FIG. 1); traces 266, 270 depict pre-synaptic input activity (e.g., the input 106_1, 108_1). Based on the spike input 268 in FIG. 2A, the post-synaptic unit may respond with the spike output 262 at times $t_1$, $t_2$, $t_3$. Thin lines in FIG. 2A (e.g., 230) depict temporal relationship between the pre-synaptic input and the earliest post-synaptic response that may follow the input. Based on individual spikes within the input 268 preceding the respective post-synaptic spikes 262, efficacy of the connection associated with the activity 266 may be increased. The efficacy increase (indicated by the upward steps shown in the trace 274 at times $t_1$, $t_2$, $t_3$) may performed be in accordance with the potentiating portion (e.g., the interval 350) of the post-synaptic rule portion 344 of FIG. 3B, shown by the panel 276 in FIG. 2A. Responsive to absence of activity on the input trace 266 is present, the efficacy of the connection may be maintained substantially unchanged for $t > t_3$. The efficacy behavior for $t > t_3$ may be based on STDP rule 344 portion corresponding to the time interval 352 in FIG. 3B.

Based on the spike input 272 via the other connection 270 in FIG. 2A, the post-synaptic unit may respond with the spike output 264 at times $t_4$, $t_5$, $t_6$, $t_7$. Based on individual spikes within the input 262 preceding the post-synaptic spikes 264, efficacy of the connection 270 may be increased. The efficacy increase (indicated by the upward steps shown in the trace 278 at times $t_1$, $t_2$, $t_3$) may be performed in accordance with the potentiating portion (e.g., the interval 350) of the post-synaptic rule portion 344 of FIG. 3B. It is noteworthy that even when the post-synaptic activity is present at times $t_4$, $t_5$, $t_6$, $t_7$, because the output 264 is due to the input 272, the efficacy of the connection associated with the activity of the trace 260 is maintained unchanged, in accordance with the rule 276.

Individual input connections may be operated in operated in accordance with activity-dependent plasticity rules, such as exemplary implementations described with respect to FIGS. 3A-4D.

Figure 3A:
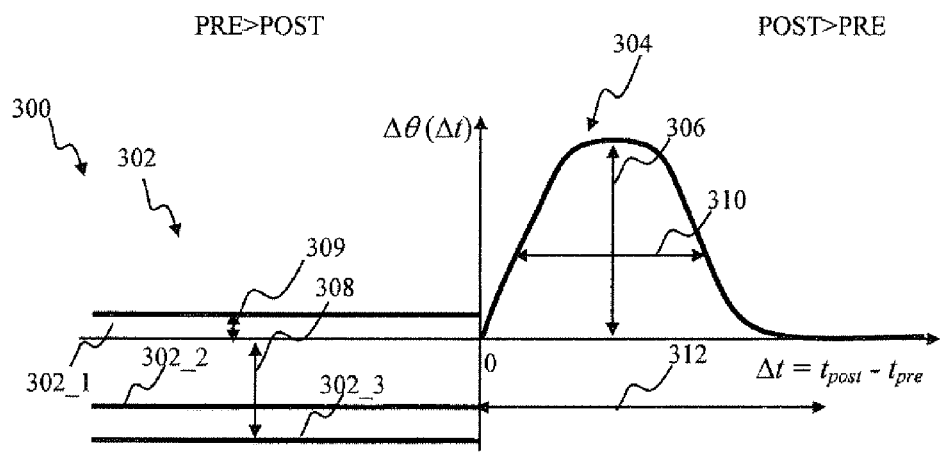
FIG. 3A is a plot depicting activity modulated plasticity comprising causal potentiation, according to one or more implementations.
Figure 3B:
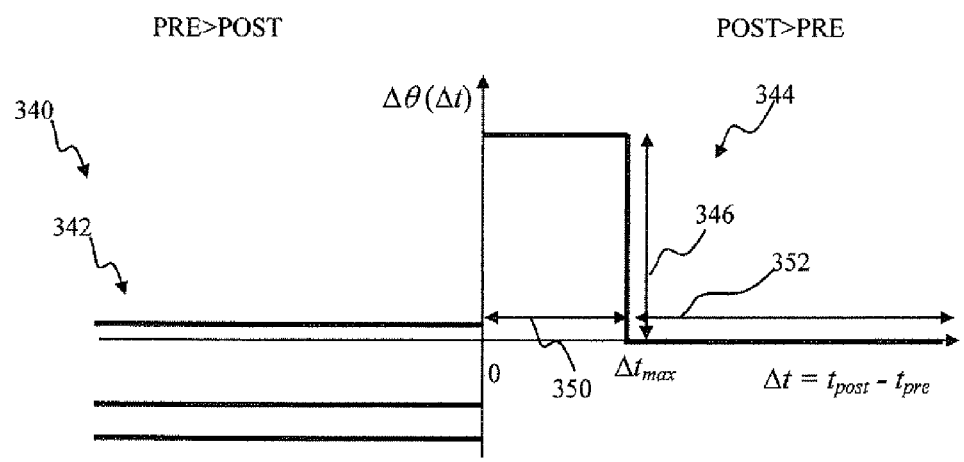
FIG. 3B is a plot depicting activity modulated plasticity comprising constant causal potentiation, according to one or more implementations.

FIGS. 3A-3B present activity modulated plasticity rules comprising causal potentiation, according to one or more implementations. The curves 300, 340 depict change in connection efficacy Δθ) determined as a function of a delay between the input and the response: $\Delta t = t_{post} - t_{pre}$. The rule 300 comprises a casual portion 304 (e.g., corresponding to the post-synaptic response being generated subsequent to the pre-synaptic input); and an anti-casual portion 302 (e.g., corresponding to the pre-synaptic input being subsequent to the post-synaptic response). The casual portion comprises a potentiating window 310 where the efficacy being increased (potentiated) by a maximum magnitude 306. As used hereinafter, the potentiation and/or depression magnitudes are referenced to the magnitude 306 (also denoted as Amax). For clarity, Amax may be set to unity in some implementations. The causal portion may be characterized by a maximum time interval $\Delta t_{max}$ between the input and the output (e.g., 312). This maximum interval may be configured such that inputs that precede the output by a time in excess of the interval 312 may not cause connection potentiation (e.g., the efficacy is maintained unchanged as (Δθ=0, $\Delta t > \Delta t_{max}$) as shown in FIG. 3A. The efficacy change associated with the anti-causal portion 302 may be determined based on activity of the post-synaptic neuron. The efficacy change may comprise connection potentiation (shown by the curve 302_1 in FIG. 3A) or depression (shown by the curves 302_2, 302_3 in FIG. 3A). The magnitude 308 of efficacy change may be determined in accordance with one or more rules described in detail below.

In some implementations, the anti-causal efficacy adjustment Δθ may be determined based on a function of the firing rate R of the post-synaptic neuron as follows:

$$\Delta\theta(\Delta t) = f(R). \tag{Eqn. 1}$$

In one or more implementations the relationship $f(R)$ may comprise a linear function of the rate R $$\Delta\theta(\Delta t) = -\alpha R + \beta. \tag{Eqn. 2}$$

The slope in Eqn. 2 may be configured as follows:

$$\alpha = -10\beta. \tag{Eqn. 3}$$

Accordingly, for R>0.1 the rule of Eqn. 2 produces connection depression (Δθ<0); and for R>0.1 the rule of Eqn. 2 produces connection potentiation (Δθ>0).

In one or more implementations the relationship $f(R)$ may comprise a quadratic function of the rate R $$\Delta\theta(\Delta t) = -\alpha 1 R^2 + \beta 1. \tag{Eqn. 4}$$

In some implementations the relationship $f(R)$ may comprise an exponential, and or a log function $$\Delta\theta(\Delta t) = -\exp(\alpha 2 R) + \beta 2, \tag{Eqn. 5}$$

$$\Delta\theta(\Delta t) = \log(\alpha 3 (R + R_0)) + \beta 3. \tag{Eqn. 6}$$

In some implementations, the rate R utilized in of Eqn. 1-Eqn. 6 may comprise an average rate of response of the neuron (e.g., firing rate). The average rate may be determined using a running mean, an exponential average, a median, and or another approach. The average rate may be determined over a time interval T preceding the response. The interval T may be selected form the range between 1 s and 2000 s.

In one or more implementations, the relationship Eqn. 1 may comprise one or more logic operations (e.g., a comparison operation between that the average response rate R and a minimum rate corresponding to a potentiation and or a depression of the connection.

In some approaches, a function of the inter-spike interval (ISI) distribution may be utilized to characterize neuron activity. The ISI distribution may be determined based on a probability of spikes occurring at times t and Δt as follows:

$$ISI(\Delta t) = p((\text{spike}|_{t=0}) \& (\text{spike}|_{t=\Delta t})) \tag{Eqn. 7}$$

In one or more implementations, neuron activity may be described using an average ISI, determined as follows:

$$E(\text{ISI}) = \int_0^\infty \text{ISI}(s)ds. \quad \text{(Eqn. 8)}$$

In one or more implementations, neuron activity may be characterized using a median value $t_m$ of the ISI, determined as:

$$\int_0^{t_m} \text{ISI}(s)ds = \int_{t_m}^\infty \text{ISI}(s)ds. \quad \text{(Eqn. 9)}$$

In some implementations, neuron activity may be characterized using an entropy of the ISI, determined as:

$$H = \int_0^\infty \text{ISI}(s)\log(\text{ISI}(s))ds. \quad \text{(Eqn. 10)}$$

FIG. 3B illustrates an activity modulated plasticity rule comprising constant causal potentiation, according to one or more implementations. The rule 340 may provide for a reduced computational load, associated with performing plasticity updates in the spiking neuron network (SNN).

The rule 340 comprises a casual portion 344 (e.g., corresponding to the post-synaptic response being generated subsequent to the pre-synaptic input); and an anti-casual portion 342 (e.g., corresponding to the pre-synaptic input being subsequent to the post-synaptic response). The casual portion comprises a potentiating window 310, wherein the efficacy is increased (potentiated) by a magnitude 346. The causal portion may be characterized by a maximum time interval $\Delta t_{max}$ between the input and the output (e.g., 350) configured such that inputs that precede the output by a time in excess of the interval 350 may not cause connection potentiation and/or depression. For example, the efficacy may be remain unchanged ($\Delta\theta=0$) over the duration 352 for $\Delta t > \Delta t_{max}$) as shown in FIG. 3B. In one or more implementations, over the interval 352 the efficacy may be maintained within a 99.9% of the efficacy value at time $\Delta t_{max}$. It will be appreciated by those skilled in the art that the above level of efficacy variation within the interval 352 is exemplary and other tolerance numbers may be utilized, in accordance with the specific implementation, provided that the efficacy is not increased/decreased substantially during the interval 352. In some implementations, the efficacy behavior during the interval $\Delta t > \Delta t_{max}$ may be described as follows:

$$\int_{\Delta t_{max}}^\infty \Delta\theta(s)ds \leq 0.1 \int_0^{\Delta t_{max}} \Delta\theta(s)ds \quad \text{(Eqn. 11)}$$

The efficacy change associated with the anti-causal portion 342 may be determined based on activity of the post-synaptic neuron. In one or more implementations, the efficacy change may comprise connection potentiation or depression, configured in accordance with Eqn. 1-Eqn. 6, described above.

In one or more approaches to processing inputs refreshed at 40 ms intervals (25 fps), the potentiating intervals 310, 350 of the rules 300, 340, respectively, may be selected from the range between 20 ms and 200 ms; the interval 312 may be configured to be between 200 ms and 1000 ms; the potentiation magnitude 309 may comprise a fraction (between, for example, 0.05 and 0.2) of the maximum potentiation magnitude Amax (306); and the depression magnitude 309 may be configured comparable to the maximum potentiation magnitude Amax (306).

FIG. 2B illustrates connection depression due to lack of post-synaptic output in response to pre-synaptic input. In FIG. 2B, the traces 280, 284 depict post-synaptic unit activity and pre-synaptic input, respectively. Based on high post-synaptic activity (the spikes 282) and absence of corresponding input on the trace 280, the anti-causal portion of the STDP rule (e.g., 342 in FIG. 3B) may be configured to cause substantial depression, as illustrated by the STDP panel 286 in FIG. 2B. Responsive to the activity 288 at times $t_1$, $t_2$, $t_3$, $t_4$, $t_5$ on the trace 284, the efficacy of the respective connection may be reduced, as illustrated by downward steps of the trace 289 corresponding to time instances $t_1$, $t_2$, $t_3$, $t_4$. In some implementations, such as shown in FIG. 2B, connection efficacy may not be reduced at time $t_5$ due to efficacy depletion control mechanism, described with respect to FIG. 3D, below.

FIG. 2C illustrates connection potentiation due to pre-synaptic input in absence of post-synaptic activity. In FIG. 2C, the traces 290, 292 depict post-synaptic unit activity and pre-synaptic input, respectively. The initially inactive pre-synaptic connection (as illustrated by absence of spikes on the trace 292 prior to time $t_1$ in FIG. 2C) may become active and deliver spiking input 294 at times $t_1$, $t_2$, $t_3$, $t_4$. Based on low (and/or absent post-synaptic activity) prior to the input 294, the anti-causal portion of the STDP rule for the connection 292 (e.g., 342 in FIG. 3B) may be configured to cause moderate potentiation, as illustrated by the STDP panel 296 in FIG. 2C. When the connection associated with the activity trace 292 becomes active and delivers spiking input 294, the connection efficacy may be increased, as illustrated by increments to the trace 299 corresponding to time instances $t_1$, $t_2$, $t_3$, $t_4$, in FIG. 2C.

Figure 3C:
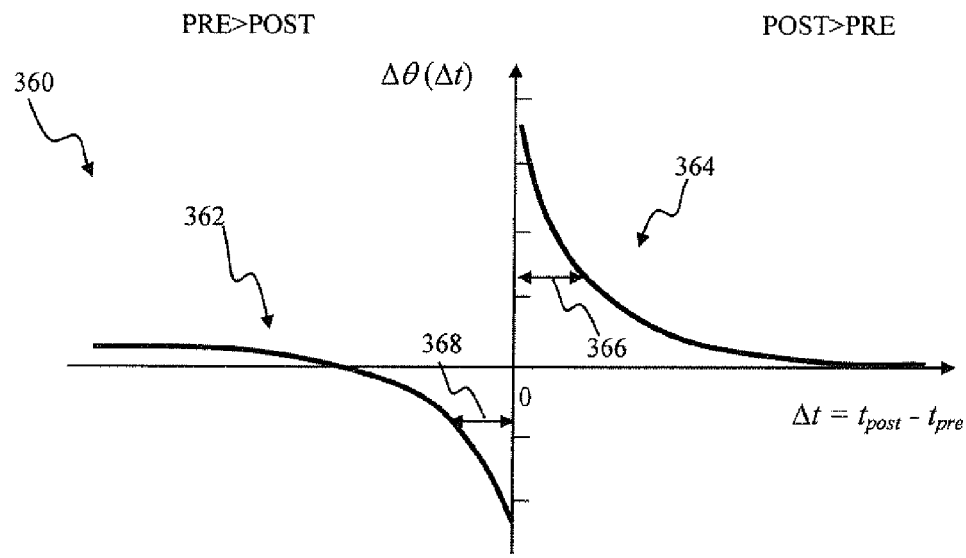
FIG. 3C is a plot depicting activity modulated plasticity comprising exponential causal potentiation, according to one or more implementations.

FIG. 3C illustrates activity modulated plasticity rule comprising exponential causal potentiation, according to one or more implementations. The rule 340 may provide for a reduced computational load, associated with performing plasticity updates in the SNN.

The rule 360 comprises a casual portion 364 (e.g., corresponding to the post-synaptic response being generated subsequent to the pre-synaptic input); and an anti-casual portion 362 (e.g., corresponding to the pre-synaptic input being subsequent to the post-synaptic response). The casual portion 364 is configured to decay exponentially with a delay between the pre-synaptic input and the post-synaptic response. In one or more implementations, the decay time scale 366 may comprise e-folding duration (e.g., the duration where the magnitude is reduced by factor of $1/\exp(1)$) that may be configured to be between 10 ms and 50 ms. The anti-casual portion 362 may be configured to cause connection depression (characterized by the interval 368 in FIG. 3C) and connection potentiation based on a delay between the post-synaptic response and the subsequent input. The efficacy change associated with the anti-causal portion 362 may be determined based on activity of the post-synaptic neuron. In one or more implementations, the efficacy change may comprise connection potentiation or depression, configured in accordance with Eqn. 1-Eqn. 6, described above.

Figure 3D:
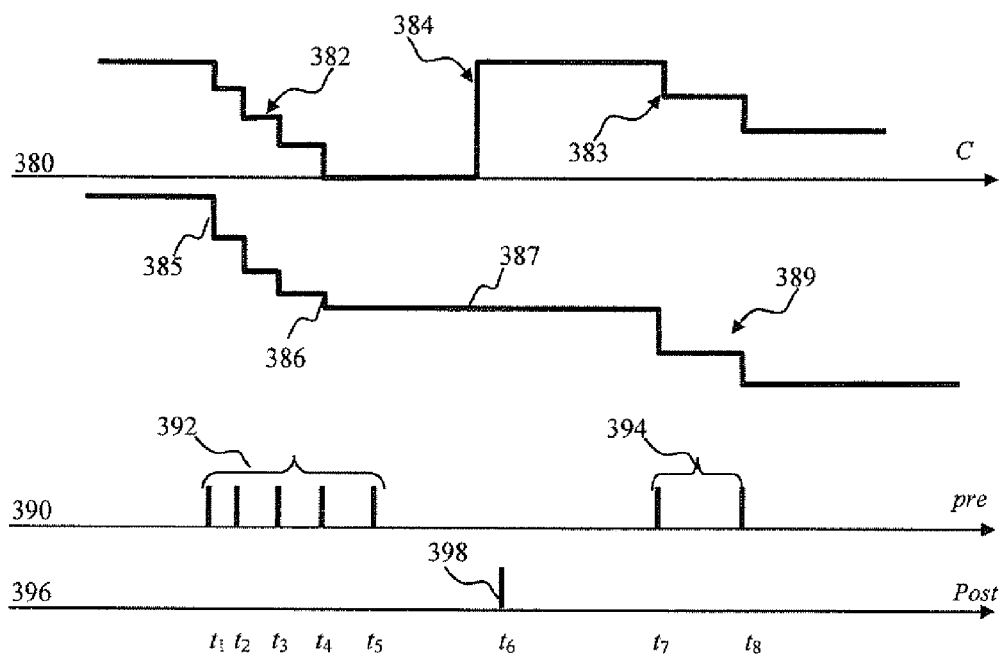
FIG. 3D is a plot depicting a resource depletion mechanism configured for activity modulated plasticity, according to one or more implementations.

FIG. 3D illustrates efficacy depletion control mechanism useful, for example, with the anti-causal portions of the activity based plasticity rules 302, 342, 362, 422 described with respect to FIGS. 3A-3C, and FIGS. 4A-4D, respectively. In one or more implementations, the efficacy depletion mechanism may be effectuated by using a resource trace C(t). The traces 380, 387, 390, 396 depict the connection resource C, the connection efficacy ($\theta$, the pre-synaptic input and the post-synaptic activity, respectively.

Responsive to the pre-synaptic input (e.g., pulses 392 in FIG. 3D) at times $t_1$, $t_2$, $t_3$, $t_4$, $t_5$ not followed by the post-synaptic output within a potentiating window (e.g., the window 350 in FIG. 3B) the connection may be depressed as illustrated by decrements of the trace 387 at times $t_1$, $t_2$, $t_3$, $t_4$. Efficacy decrease may be configured using the activity based STDP modulation (e.g., anti-causal rule 302_3 of FIG. 3A). Individual efficacy decrements (e.g., 385, 387) may be accompanied by decrements of the resource C (e.g., decrements 382 in FIG. 3D). Based on depletion of the resource C below a threshold value $C_{min}$, (e.g., $C_{min}=0$ in FIG. 3D), the connection may not be depressed further, as indicated by absence of the efficacy 387 decrease at time $t_5$ in FIG. 3D. In some implementations, such as illustrated in FIG. 3D, the efficacy adjustment may be based on the resource level $|\Delta\theta|\sim f(C)$. As shown in FIG. 3D, efficacy decrease 385 is greater in magnitude than the decrease 386 at time $t_1$. In some implementations, (not shown) the connection efficacy adjustment may be independent of the resource value C, provided $C>C_{min}$.

The resource may be replenished responsive to a post-synaptic response is generated, as illustrated by the resource increase 384 at time $t_6$ of the post-synaptic response 398 in FIG. 3D. Based on the occurrence of one or more subsequent pre-synaptic inputs on the connection 390 (e.g., the spikes 394) the connection efficacy may be further decreased, as shown by the decreases 389 at times $t_7$, $t_8$ in FIG. 3D.

Figure 4A:
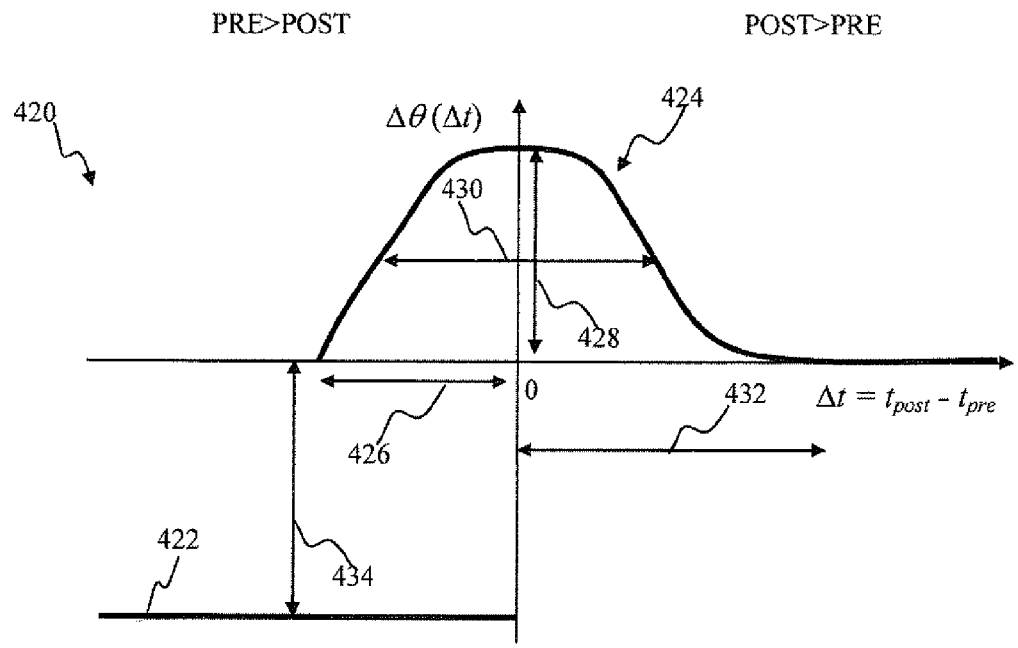
FIG. 4A is a plot depicting activity modulated plasticity comprising causal and anti-causal potentiation and a multi-branch anti-casual rule, according to one or more implementations.

FIG. 4A illustrates activity modulated plasticity rule comprising causal and-anti-causal potentiation, according to one or more implementations. The rule 420 of FIG. 4A may comprise a potentiating portion 424 configured to potentiate connections providing inputs that are proximate (e.g., within the time interval 430) from the post-synaptic response. The casual portion of the rule 420 may be configured to leave connection efficacy unchanged, based on the inputs provided by the connection preceding the response by a time interval in excess of the range 432 in FIG. 4A.

The anti-casual portion of the rule 420 may comprise a depression portion 422 configured in accordance with any applicable activity based methodologies described herein. The maximum depression magnitude 434 of the anti-causal rule 422 may be configured comparable to the maximum potentiation magnitude 428. During network operation, the actual magnitude 434 of the anti-causal rule 422 may be configured based on the neuron response rate such that the rule portion 422 may cause potentiation or depression. In applications of with processing inputs refreshed at 40 ms intervals (25 fps), the duration 430 of the potentiation portion may range from 20 ms to 400 ms, inclusive.

In some implementations, the plasticity rule comprising causal and anti-causal potentiation may comprise a potentiating portion (e.g., associated with the window 430 in FIG. 4A) may be characterized by constant magnitude (not shown).

Figure 4B:
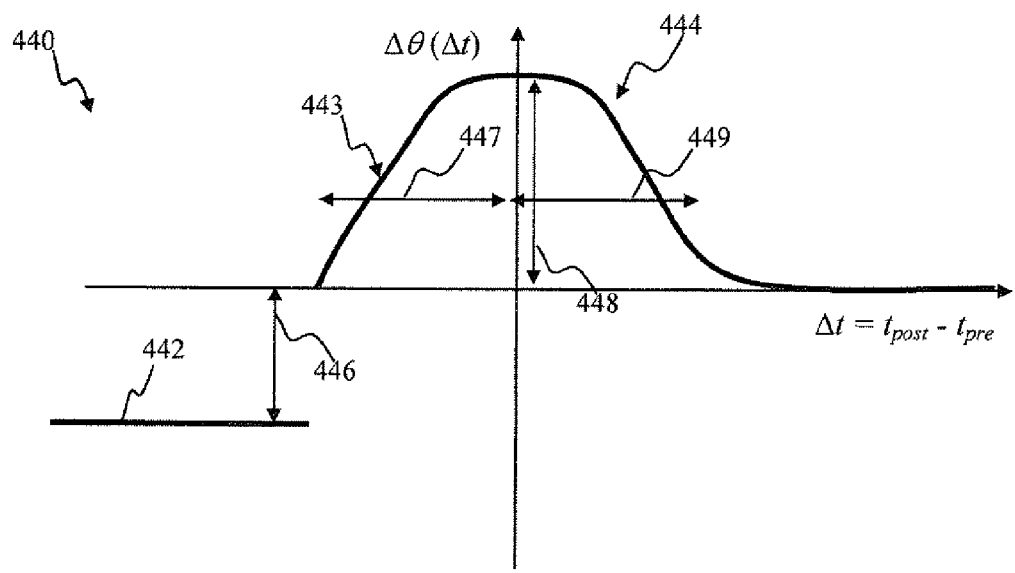
FIG. 4B is a plot depicting activity modulated plasticity comprising causal and anti-causal potentiation, according to one or more implementations.

FIG. 4B illustrates activity modulated plasticity comprising causal and anti-causal potentiation, according to one or more implementations. The rule 440 may comprise a casual portion 444 configured to potentiate connections providing inputs that are proximate (e.g., within the time interval 449) prior to the post-synaptic response. Casual portion 444 of the rule 440 may be configured to leave connection efficacy unchanged, based on the inputs provided by the connection preceding the response by a time interval in excess of the range 449 in FIG. 4B.

The anti-casual portion of the rule 440 of FIG. 4B may comprise a potentiation portion 443 and a depression portion 442. The potentiation portion 443 may be configured to potentiate connections providing inputs that are proximate (e.g., within the time interval 447 in FIG. 4B) subsequent to the post-synaptic response. The maximum potentiation magnitude of the anti-causal rule portion 432 may be configured on the order of the maximum potentiation magnitude 448. In one or more implementations of processing inputs refreshed at 40 ms intervals (25 fps), duration of individual time windows 447, 449 may be configured between 20 ms and 200 ms.

The anti-casual depression portion 442 may be configured in accordance with any applicable activity based methodologies described herein. The maximum depression magnitude 446 of the anti-causal rule 442 may be configured comparable to the maximum potentiation magnitude 448. During network operation, the actual magnitude 446 of the anti-causal rule 442 may be configured based on the neuron response rate so that the rule portion 442 may cause potentiation or depression.

Figure 4C:
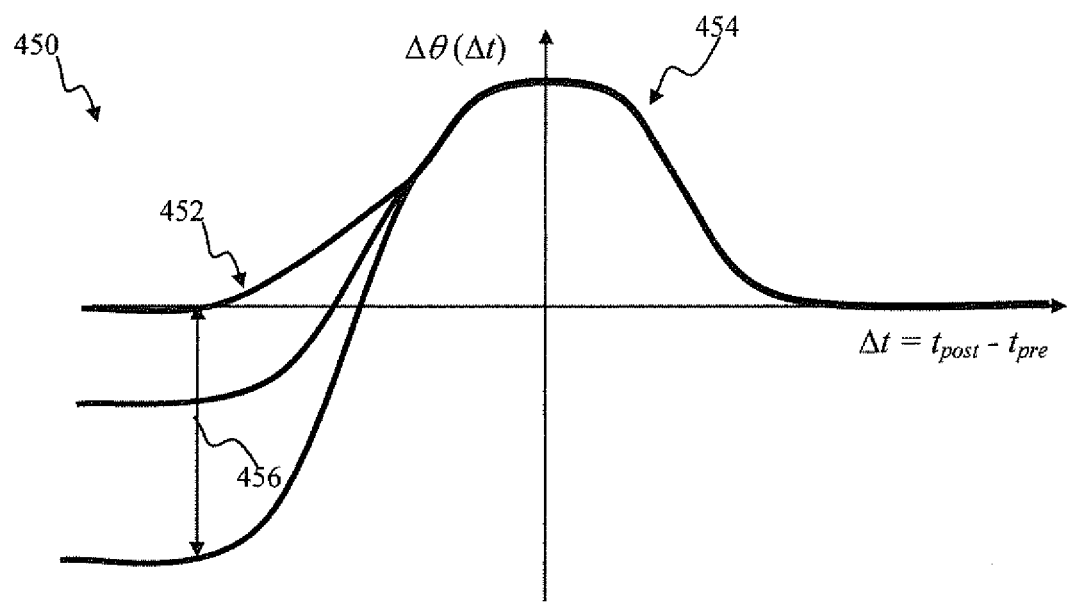
FIG. 4C is a plot depicting activity modulated plasticity comprising causal and anti-causal potentiation, configured using a continuous function, according to one or more implementations.

FIG. 4C illustrates activity modulated plasticity realization 450 comprising causal 454 and anti-causal 452 rules, according to one or more implementations. The anti-casual rule 452 may be configured using a continuous dependency. The anti-casual rule 452 may comprise a portion configured in accordance with any applicable activity based methodologies described herein. During network operation, the actual magnitude 456 of the anti-causal rule 452 may be configured based on the neuron response rate so that the rule portion 452 may cause potentiation or depression.

Figure 4D:
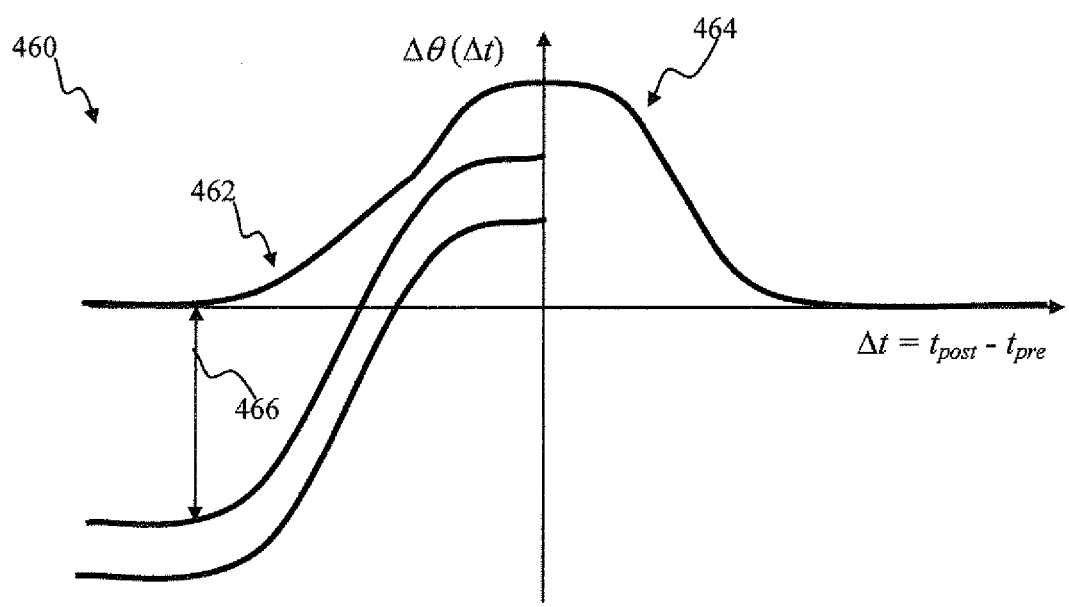
FIG. 4D is a plot depicting activity modulated plasticity comprising causal and anti-causal potentiation, configured using a multi-branch dependency, according to one or more implementations.

FIG. 4D illustrates activity modulated plasticity rule 460 comprising causal 464 and anti-causal 462 portions, according to one or more implementations. The anti-casual rule portion 462 may be configured using two or more branches, e.g., as illustrated in FIG. 4D. The anti-casual rule 462 may comprise a portion configured in accordance with any applicable activity based methodologies described herein. During network operation, the actual magnitude 466 of the anti-causal rule 462 may be configured based on the neuron response rate so that the rule portion 452 may cause potentiation or depression.

FIGS. 5-9 illustrate exemplary methods of using the activity based plasticity mechanism in the operation of spiking neuron networks. In one or more implementations, the operations of methods 500, 600, 700, 800, 900 of FIGS. 5-9, respectively, may be effectuated by a processing apparatus comprising a spiking neuron network such as the apparatus 1000 of FIG. 10, described in detail below.

Figure 5:
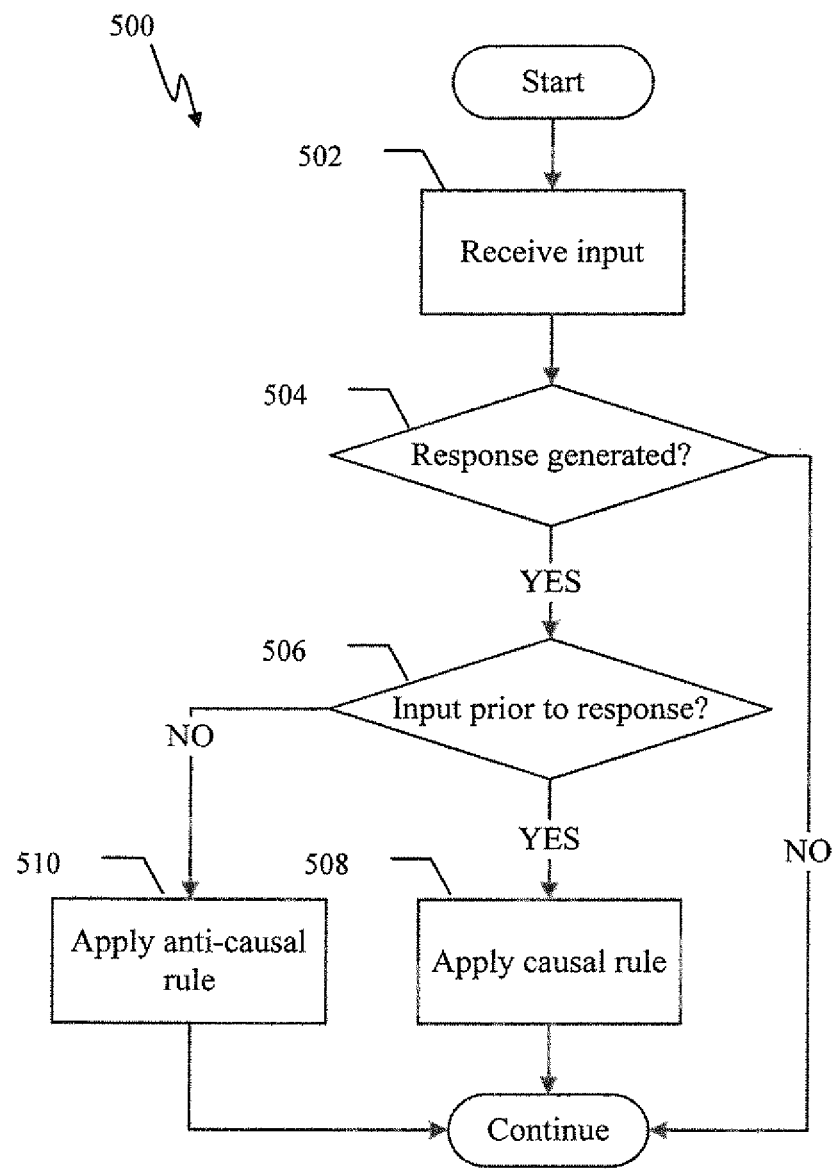
FIG. 5 is a logical flow diagram illustrating a generalized method of activity-dependent plasticity, in accordance with one or more implementations.

FIG. 5 illustrates an exemplary implementation of a generalized method of using activity-dependent plasticity in a spiking neuron network processing apparatus. At operation 502 of method 500, input may be received by a spiking neuron of the network. The input may comprise image frames received from an image sensor (such as a CCD or a CMOS sensor device). In one or more implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) may be utilized with the various aspects of the present disclosure. Furthermore, data frames corresponding to other (non-visual) signal modalities such as sonograms, IR, radar or tomography images are equally compatible with the processing network of FIG. 1, or yet other configurations.

At step 504, a determination may be made as to whether the response has been generated and a plasticity update is to be performed. In one or more implementations, the update may be based for example on an external event (e.g., reinforcement signal); a timer event (e.g., for cyclic updates); or a buffer overflow event (e.g., indicative of a memory buffer, storing, e.g., pre-synaptic and/or post-synaptic spike history) being full or nearly full. The history may comprise time data of pre-synaptic spikes stored in a synaptic memory buffer, such as described for example in U.S. patent application Ser. No. 13/239,259, entitled "APPARATUS AND METHOD FOR PARTIAL EVALUATION OF SYNAPTIC UPDATES BASED ON SYSTEM EVENTS", filed on Sep. 21, 2011, incorporated supra.

When the update is to be performed, the method may proceed to step 608, where a post-synaptic update may be performed. In one or more implementations, the post-synaptic update may comprise e.g., one or more post-synaptic rule portions 300, 320, 340 illustrated in FIGS. 3A-3C.

If it is determined that the update is to be performed, the method may proceed to operation 506 where a determination may be made as to whether the input occurred prior to the response.

If the input has occurred prior to the response, the method may proceed to operation 508 where a causal plasticity rule may be applied. In one or more implementations, the casual rule may be configured in accordance with one or more rules 304, 344, 364, 424 described above with respect to FIGS. 3A-4D.

If the input has occurred subsequent to the response, the method may proceed to operation 510 wherein an anti-causal plasticity rule may be applied. In one or more implementations, the anti-casual rule may be configured in accordance with one or more rules 302, 342, 362, 422 described above with respect to FIGS. 3A-4D.

Figure 6:
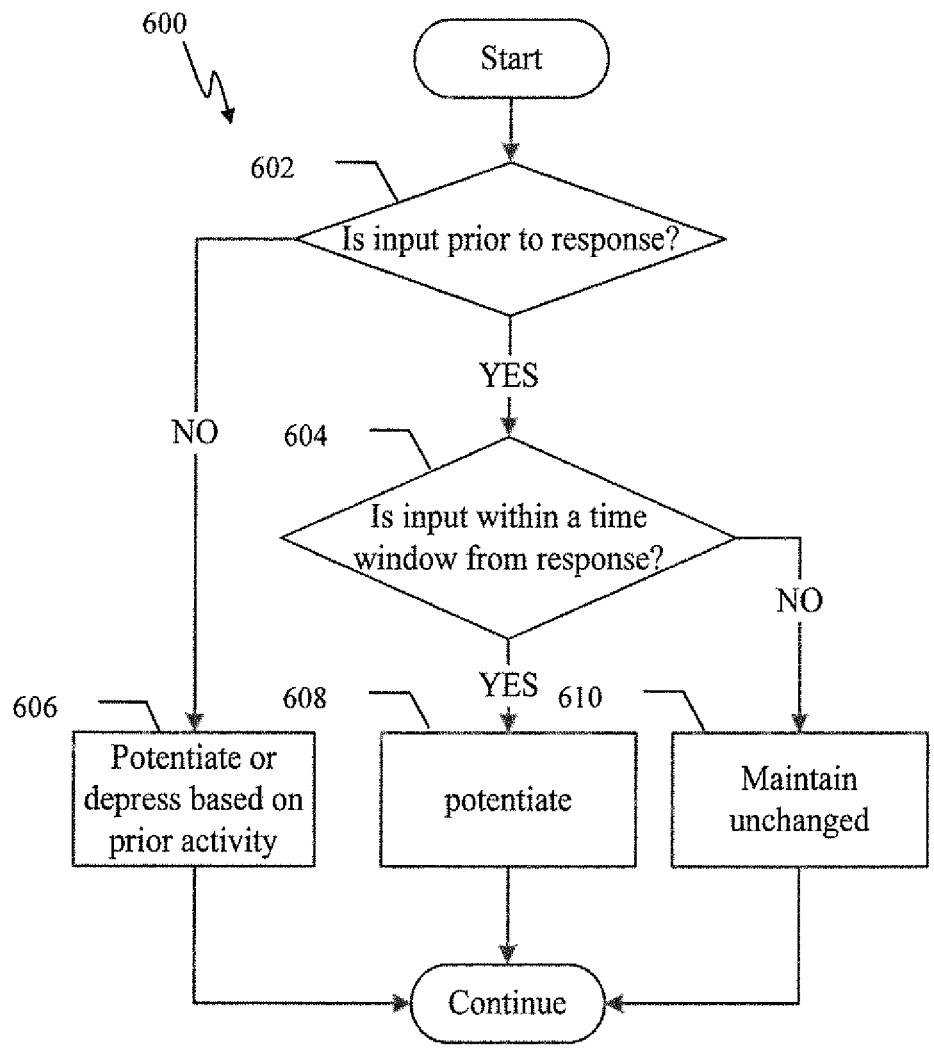
FIG. 6 is a logical flow diagram illustrating a method of activity dependent plasticity comprising causal potentiation for use with the network of FIG. 1, in accordance with one or more implementations.

FIG. 6 illustrates a method of activity dependent plasticity comprising causal potentiation (such as, e.g., rule 340 of FIG. 3B) for use with the network of FIG. 1, in accordance with one or more implementations.

At operation 602 a determination may be made as to whether the input occurred prior to the response. In one or more implementations, time of occurrence of individual pre-synaptic and/or post-synaptic events (e.g., 262, 268, 264, 272 in FIG. 2A) may be utilized in order to make the determination of operation 602. In some implementations, a time difference between a respective pre-synaptic and/or post-synaptic event and a reference event (e.g., frame onset and/or timer alarm) may be utilized.

If the input has occurred prior to the response, the method may proceed to operation 604 where a determination may be made as to whether a time difference between the response and the input is within a potentiating interval (e.g., 350 in FIG. 3B).

If the delay between the input the response is within the potentiating interval, the connection may be potentiated at step 608.

If the delay between the input the response is longer than the potentiating interval, the connection efficacy may remain unchanged.

If the input has occurred subsequent to the response, the method may proceed to operation 606 where the connection may be potentiated or depressed in accordance with the activity based plasticity mechanism. In one or more implementations, the plasticity rule may be configured based on one or more of Eqn. 1-Eqn. 6, described above.

Figure 7:
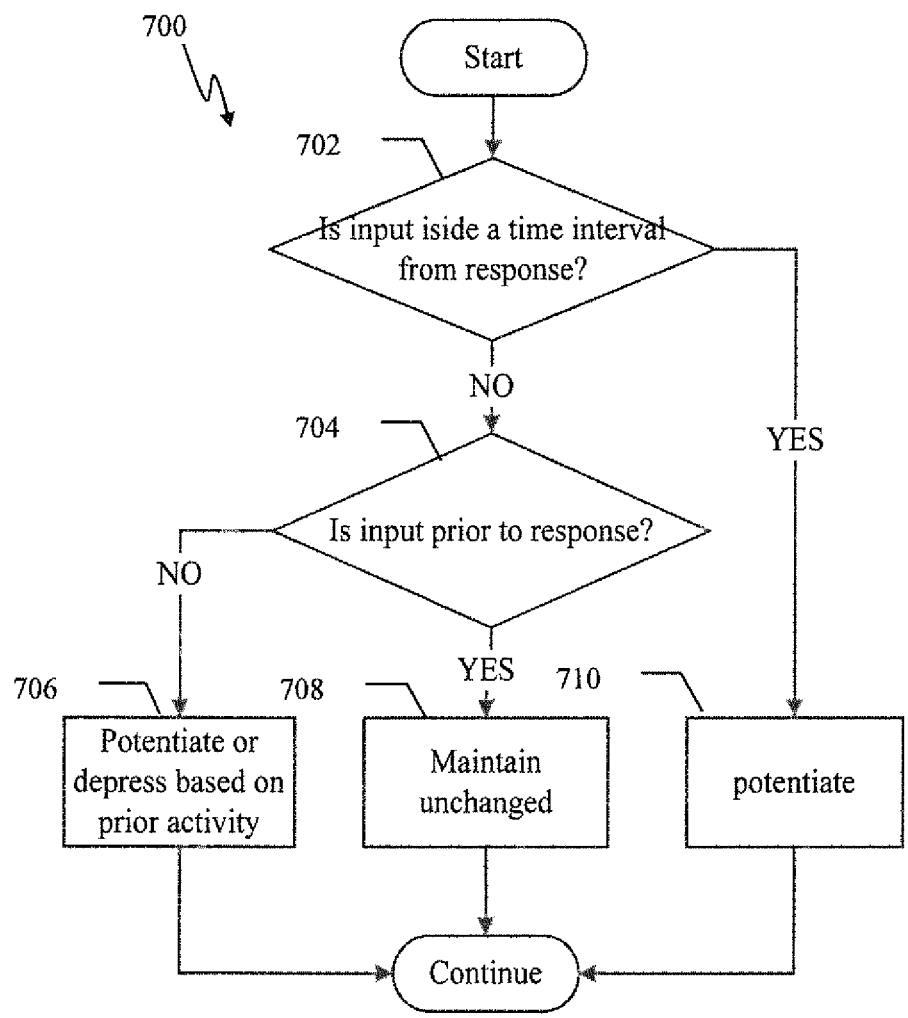
FIG. 7 is a logical flow diagram illustrating a method of activity dependent plasticity comprising causal and anti-causal potentiation for use with the network of FIG. 1, in accordance with one or more implementations.

FIG. 7 illustrates an exemplary method of activity dependent plasticity comprising causal and anti-causal potentiation (such as, e.g., rule 420 of FIG. 4A) for use with the network of FIG. 1.

At operation 702 of method 700 a determination may be made as to whether the input has occurred outside a time interval (e.g., 430 in FIG. 4A) from the response.

If the input has occurred within the potentiating interval from the response, the method may proceed to operation 710 where connection may be potentiated. In one or more implementations, the potentiation may comprise applying the potentiating portion 424 of rule 420 of FIG. 4A.

When it is determined at operation 702 that the input has occurred outside the potentiating window, the method may proceed to operation 704 wherein a determination may be made as to whether the input occurred prior to the response.

If the input has occurred prior to the response, the method may proceed to step 708 wherein the connection efficacy may remain unchanged.

If the input has occurred subsequent to the response, the method may proceed to operation 706 wherein the connection may be potentiated or depressed in accordance with the activity based plasticity mechanism. In one or more implementations, the plasticity rule may be configured based on one or more of Eqn. 1-Eqn. 6, described above.

Figure 8:
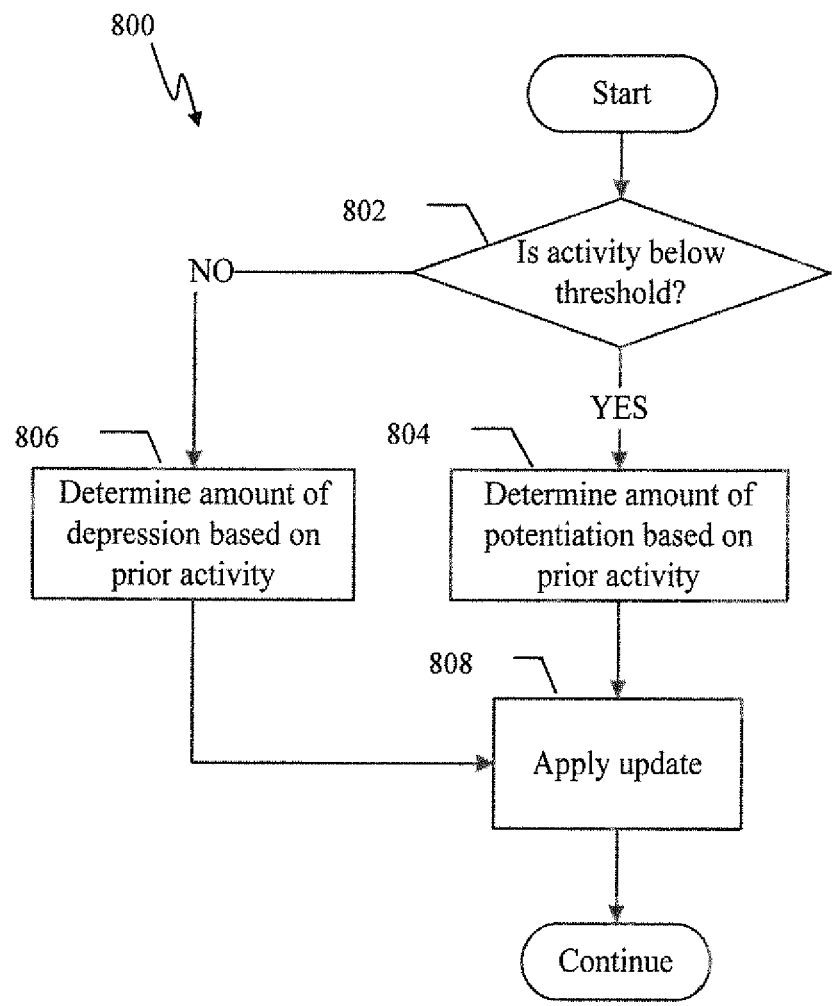
FIG. 8 is a logical flow diagram illustrating a method efficacy adjustment determination of activity dependent plasticity comprising causal potentiation for use with the network of FIG. 1, in accordance with one or more implementations.

FIG. 8 illustrates a method efficacy adjustment determination for use with activity dependent plasticity rules of FIGS. 3A-4D, in accordance with one or more implementations.

At operation 802 of method 800 a determination may be made as to whether the neuron activity is below a potentiation threshold. In one or more implementations, the threshold may correspond to an average firing rate configured such that when the average rate is below the threshold the connection is potentiated; and when the average rate is above the threshold, the connection may be depressed. In one or more implementations the comparison of operation 802 may be implicitly performed by configuring parameters of the rules of Eqn. 1-Eqn. 6, e.g., the relationship Eqn. 3.

If it is determined at operation 802 that the activity is below the threshold (e.g., the neuron responds infrequently), the connection adjustment may comprise an efficacy increase configured, for example, determined at operation 804 using one or more of Eqn. 1-Eqn. 6.

If it is determined at operation 802 that the activity is above the threshold (e.g., the neuron responds infrequently), the connection adjustment may comprise an efficacy decrease configured, for example, as determined at operation 808 using one or more of Eqn. 1-Eqn. 6.

At operation 808, connection efficacy may be updated (e.g., potentiated of depressed) based on various determinations of the operations 804, 806.

Figure 9:
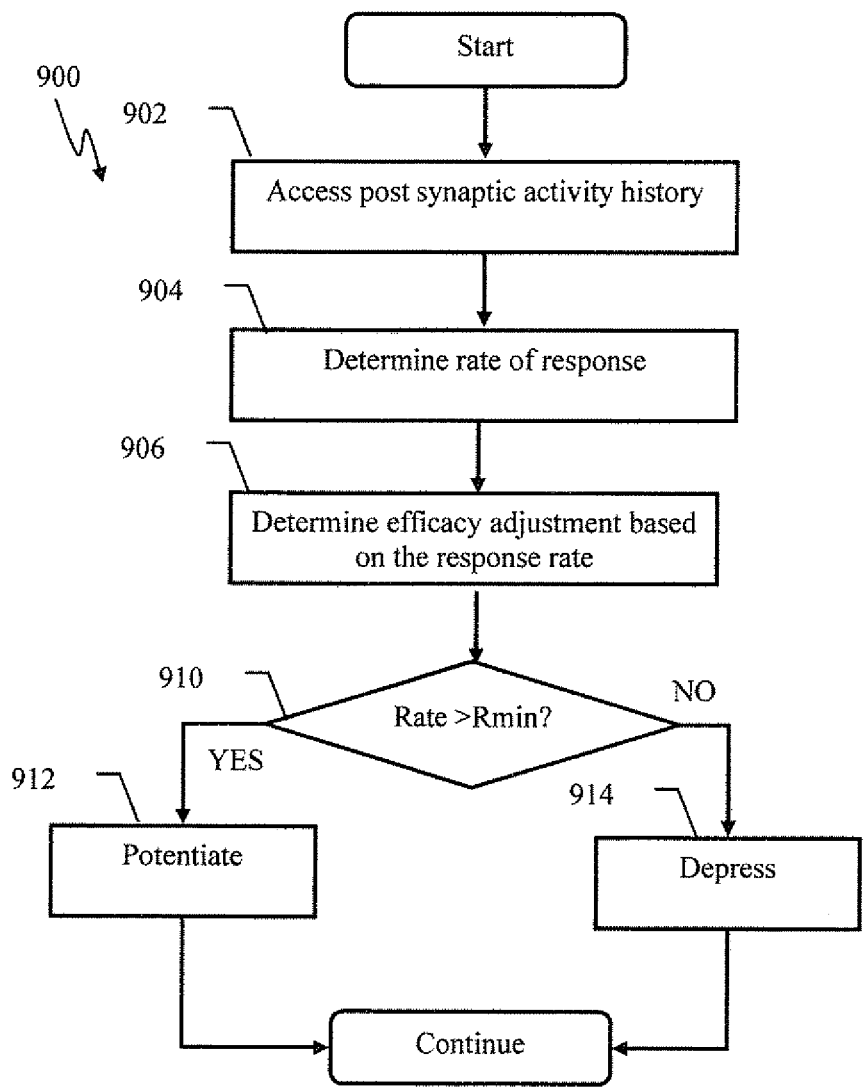
FIG. 9 is a logical flow diagram illustrating a method efficacy adjustment based on response rate, in accordance with one or more implementations.

FIG. 9 illustrates an exemplary method of adjusting connection efficacy based on a neuron response rate.

At operation 902 of method 900, post-synaptic activity history of a neuron may be accessed. In some implementations, the history may comprise time data of post-synaptic spikes stored in a neuron private and/or shared memory. In some implementations, the history may comprise time data of (i) pre-synaptic spikes stored in a synaptic memory buffer, such as those described for example in U.S. patent application Ser. No. 13/239,259, entitled "APPARATUS AND METHOD FOR PARTIAL EVALUATION OF SYNAPTIC UPDATES BASED ON SYSTEM EVENTS", filed on Sep. 21, 2011, incorporated supra; and (ii) delays between the pre-synaptic input and the respective post-synaptic spikes (e.g., a time interval 217 between time t2 and t1 in FIG. 2A).

At operation 904, a rate of response may be determined based on the history of post-synaptic activity. In one or more implementations, the response rate may comprise an average rate, determined using a running mean, an exponential average, a median of the activity history values, and or another approach. The average rate may be determined over a time interval T preceding the response. The interval T may be selected form the range between 1 s and 2000 s. In one or more implementations, the average rate may be determined using an exponential running average.

At operation 906 an efficacy adjustment (corresponding to the rate of response produced by operation 904 above) may be determined. In one or more implementations, the efficacy adjustment may be determined using one or more of Eqn. 1-Eqn. 6.

At operation 908 a determination may be made as to whether the rate R produced by operation 904 above exceeds a minimum rate (Rmin) corresponding to connection potentiation.

If it is determined that R>Rmin, the method may proceed to operation 912 where connection may be potentiated (efficacy increased).

If it is determined that R<Rmin, the method may proceed to operation 916 where connection may be depressed (efficacy decreased).

Various exemplary spiking network apparatus implementing one or more of the methods set forth herein (e.g., using the exemplary activity dependent plasticity mechanisms described above) are now described with respect to FIGS. 10-11D.

Figure 10:
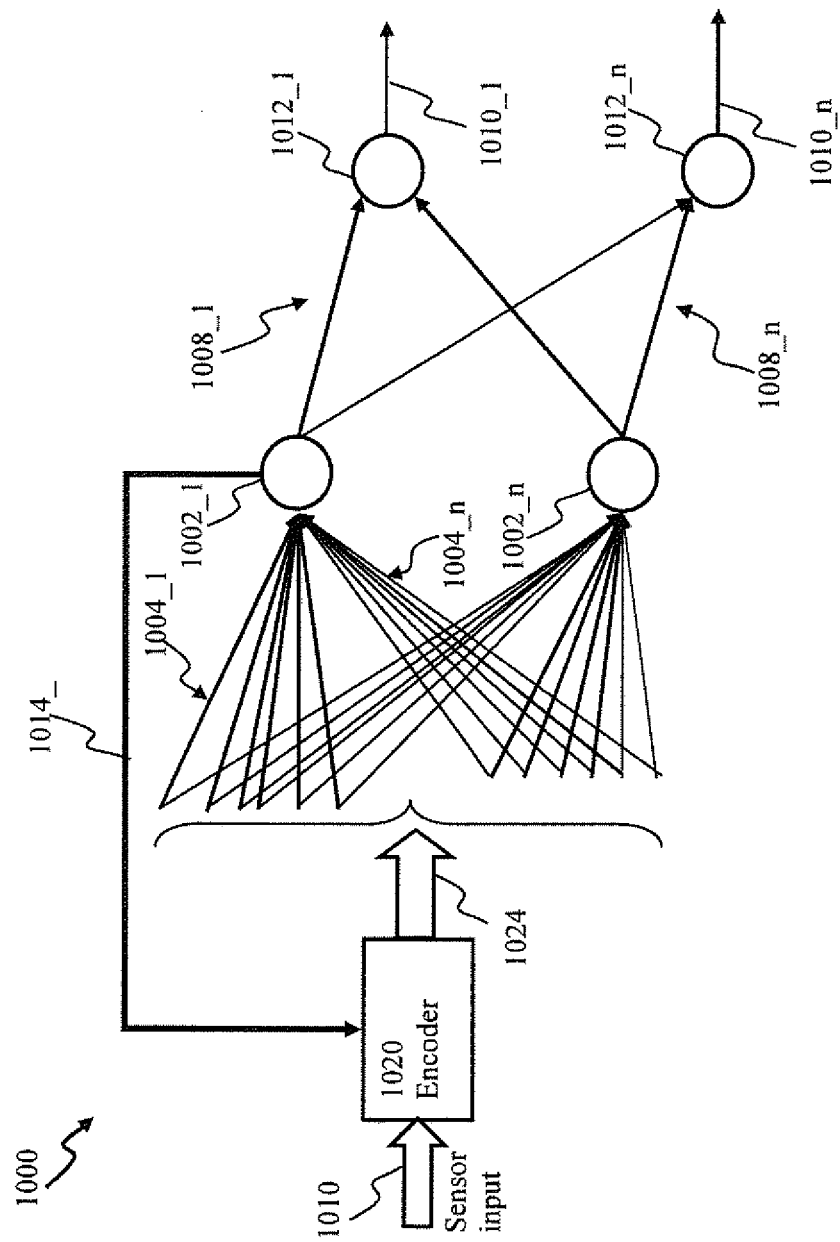
FIG. 10 is a block diagram illustrating a sensory processing apparatus comprising adaptive plasticity mechanism in accordance with one or more implementations.

One exemplary apparatus for processing of sensory information (e.g., visual, audio, somatosensory) using a spiking neural network (including one or more of the activity dependent plasticity mechanisms described herein) is shown in FIG. 10. The illustrated processing apparatus 1000 includes an input interface configured to receive an input sensory signal 1010. In some implementations, this sensory input comprises electromagnetic waves (e.g., visible light, IR, UV, and/or other wavelength) entering an imaging sensor array (comprising RGCs, a charge coupled device (CCD), CMOS device, or an active-pixel sensor (APS)). The input signal in this example is a sequence of images (image frames) received from a CCD or a CMOS camera via a receiver apparatus, or downloaded from a file. Alternatively, the image may be a two-dimensional matrix of RGB values refreshed at a 25 Hz frame rate. It will be appreciated by those skilled in the art that the above image parameters and components are merely exemplary, and many other image representations (e.g., bitmap, CMYK, grayscale, and/or another representation) and/or frame rates may be utilized with the present disclosure.

The apparatus 1000 may comprise an encoder 1020 configured to transform (encode) the input signal so as to form an encoded signal 1024. In one variant, the encoded signal comprises a plurality of pulses (also referred to as a group of pulses) configured to model neuron behavior. The encoded signal 1024 may be communicated from the encoder 1020 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in FIG. 10 for clarity, it is appreciated that the encoder can be coupled to any number of detector nodes that is compatible with the detection apparatus hardware and/or software resources. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004. To produce post-synaptic detection signals transmitted over communication channels 1008 various implementations may use, for example, any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each of which being incorporated herein by reference in its entirety. In FIG. 10, the designators 1008_1, 1008_n denote output of the detectors 1002_1, 1002_n, respectively.

In one implementation, the detection signals are delivered to a next layer of the detectors 1012 (comprising detectors 1012_1, 1012_2m, 1012_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Individual detectors 1002 may output detection (post-synaptic) signals on communication channels 1008_1, 1008_n (with appropriate latency) that may propagate with different conduction delays to the detectors 1012. The detector cascade of the apparatus of FIG. 10 may contain any practical number of detector nodes and detector banks determined, inter alia, by the software/hardware resources of the detection apparatus, and/or complexity of the objects being detected.

The sensory processing apparatus implementation illustrated in FIG. 10 may further comprise lateral connections 1006. In some variants, the connections 1006 are configured to communicate post-synaptic activity indications between neighboring neurons of the same hierarchy level, as illustrated by the connection 1006_1 in FIG. 10. The neighboring neuron may comprise neurons having overlapping inputs (e.g., the inputs 1004_1, 1004_n in FIG. 10), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 10. In some implementations, the feedback connection 1014_2 is configured to provide feedback to the encoder 1020, thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
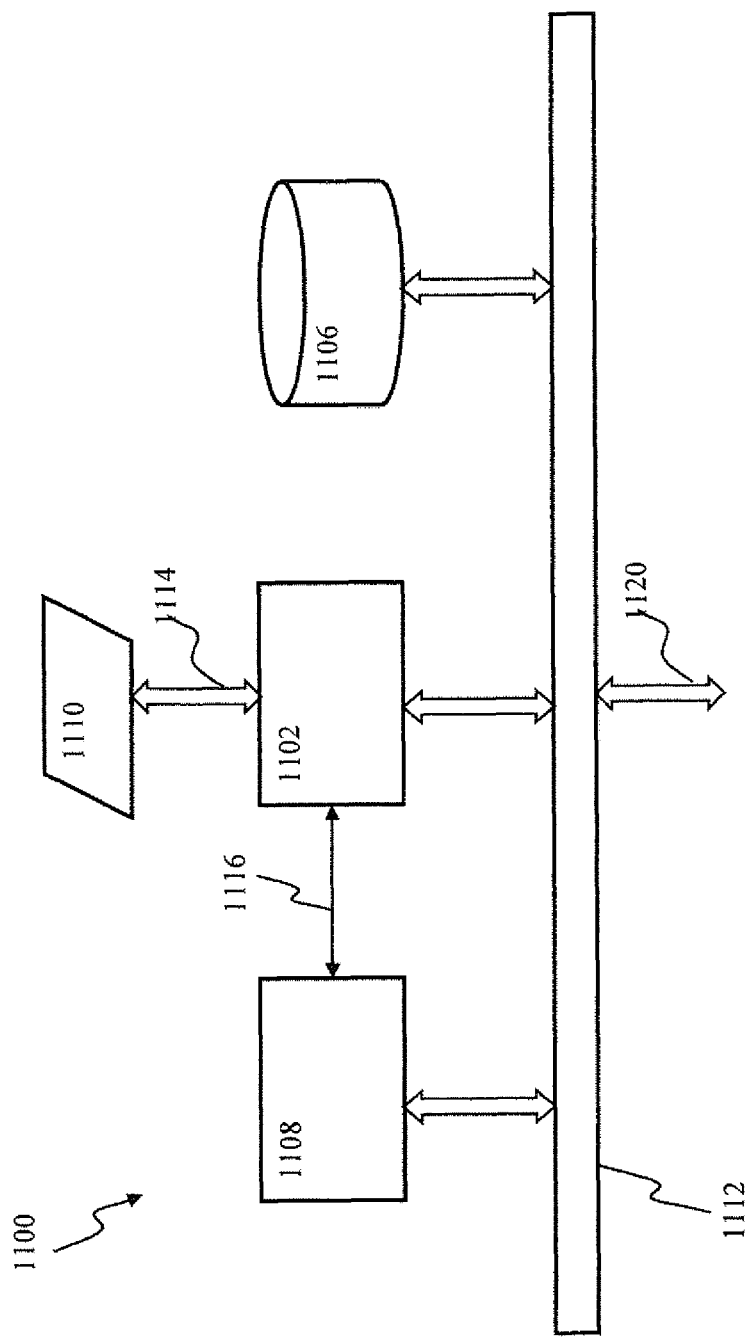
FIG. 11A is a block diagram illustrating a computerized system configured to, inter alia, provide an adaptive plasticity mechanism in a spiking network, in accordance with one or more implementations.

One particular implementation of the computerized neuromorphic processing system, adapted for operating a computerized spiking network (and implementing the exemplary plasticity methodology described supra), is illustrated in FIG. 11A. The computerized system 1100 of FIG. 11A comprises an input interface 1110, such as for example an image sensor, a computerized spiking retina, an audio array, a touch-sensitive input device, and/or another IO device. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 108 in FIG. 1A), and to facilitate synaptic updates. In some exemplary implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, and/or other processing functions). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, and/or other parameters) for later use, and/or loading of a previously stored network configuration.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 11B:
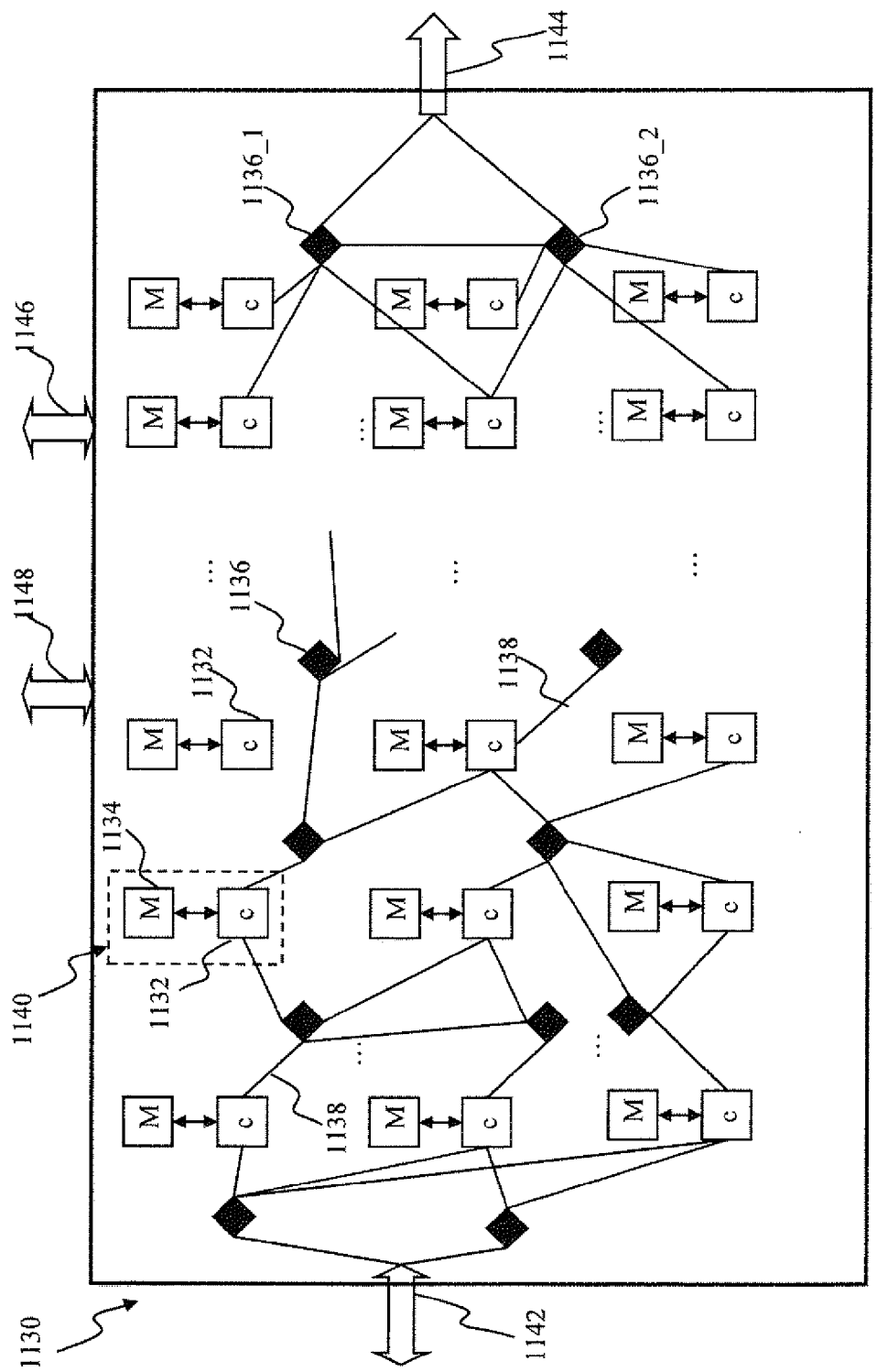
FIG. 11B is a block diagram illustrating a neuromorphic computerized system configured to operate in accordance with, inter alia, an adaptive plasticity mechanism in a spiking network.

Referring now to FIG. 11B, one implementation of neuromorphic computerized system configured to implement classification mechanism using a spiking network is described in detail. The neuromorphic processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. External memory may include one or more of a Flash drive, a magnetic drive, and/or other external memory.

Figure 11C:
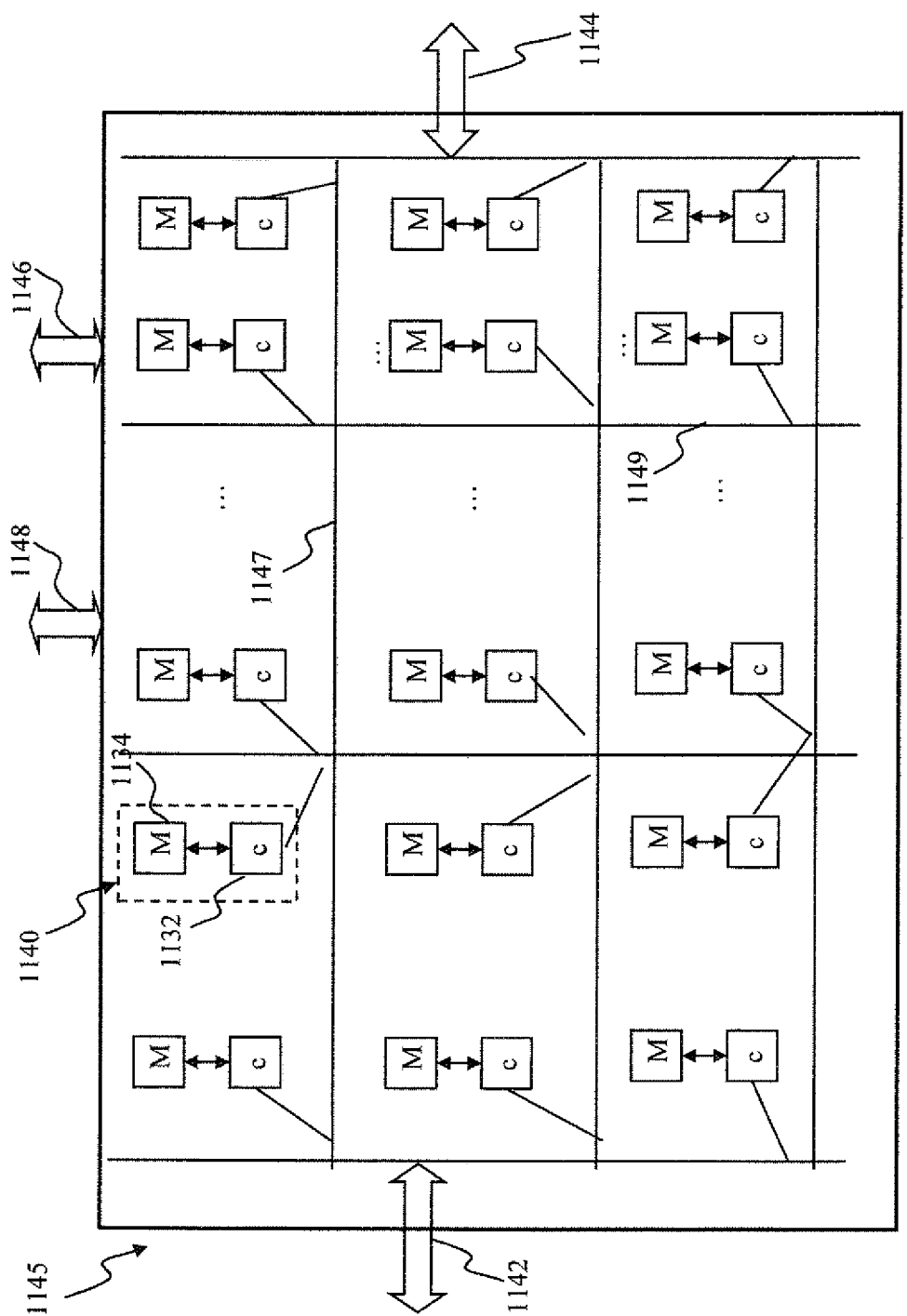
FIG. 11C is a block diagram illustrating a hierarchical neuromorphic computerized system architecture configured to operate in accordance with, inter alia, an adaptive plasticity mechanism in a spiking network.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
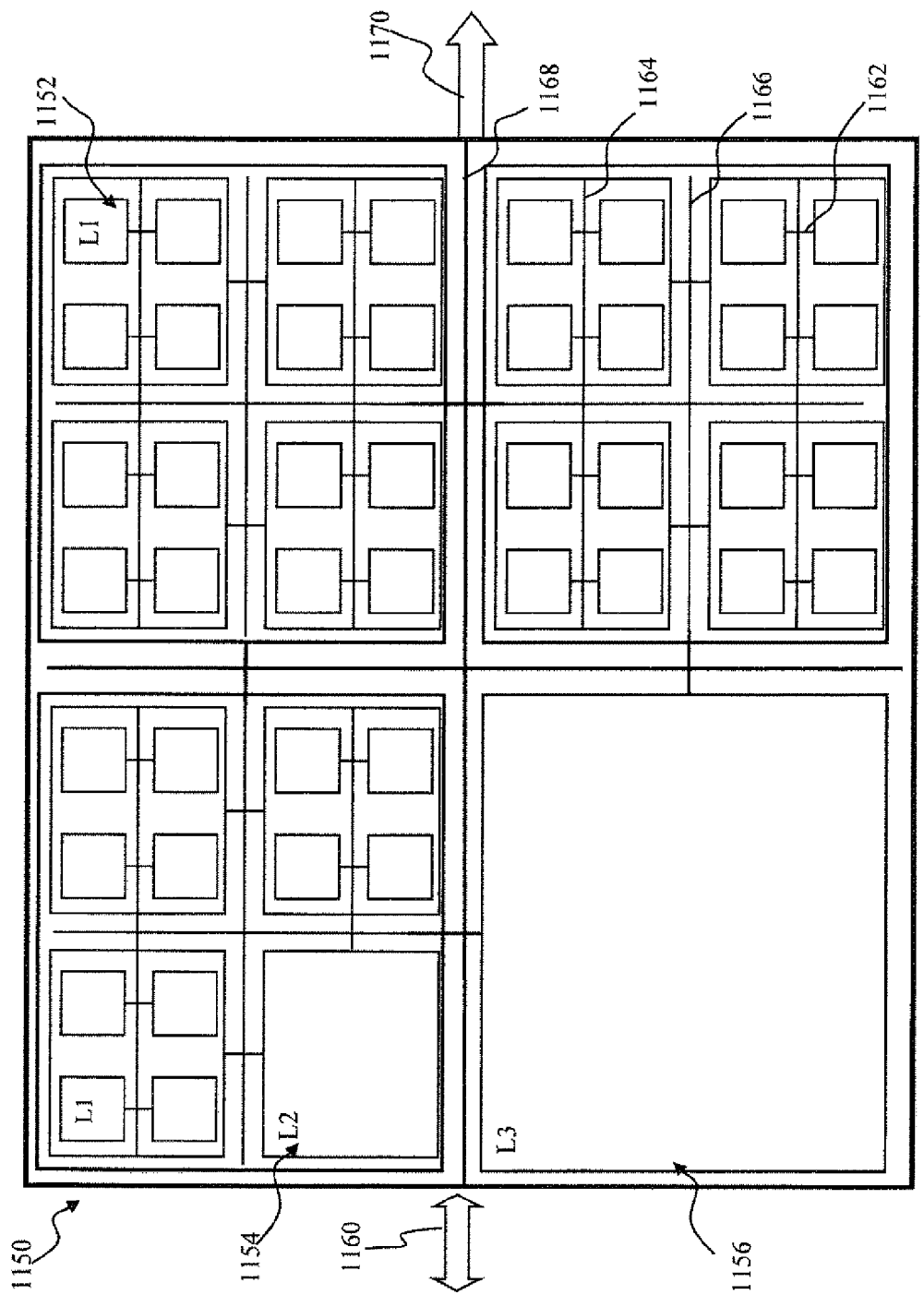
FIG. 11D is a block diagram illustrating cell-type neuromorphic computerized system architecture configured to operate in accordance with, inter alia, an adaptive plasticity mechanism in a spiking network.

FIG. 11D illustrates one implementation of cell-based neuromorphic computerized system architecture configured to implement activity-based plasticity mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11d. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations that may be applicable to, for example, interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576, entitled "DYNAMICALLY RECONFIGURABLE STOCHASTIC LEARNING APPARATUS AND METHODS", incorporated supra.

In one or more implementations, one or more portions of the apparatus 1150 may be configured to operate one or more learning rules, as described for example in owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

In one or more implementations, networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS", filed Sep. 21, 2011, and/or High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing incorporated supra. The HLND framework may be augmented to handle an event based update methodology, for example, such as that described in U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. The networks may be updated using an efficient network update methodology, described, for example, U.S. patent application Ser. No. 13/239,259, entitled "APPARATUS AND METHOD FOR PARTIAL EVALUATION OF SYNAPTIC UPDATES BASED ON SYSTEM EVENTS", filed Sep. 21, 2011 and/or U.S. patent application Ser. No. 13/385,938, entitled "APPARATUS AND METHODS FOR EFFICIENT UPDATES SPIKING NEURON NETWORKS", filed Jul. 27, 2012, each of the foregoing being incorporated herein by reference in its entirety.

In some implementations, the END may be used to describe and/or simulate large-scale neuronal model using software and/or hardware engines. The END may allow for optimal architecture realizations comprising a high-performance parallel processing of spiking networks with spike-timing dependent plasticity. Neuronal network configured in accordance with the END may comprise units and doublets, the doublets being connected to a pair of units. Execution of unit update rules for the plurality of units is order-independent and execution of doublet event rules for the plurality of doublets is order-independent.

In one or more implementations, the efficient update methodology (e.g., for adjusting input connections and/or inhibitory traces) may comprise performing of pre-synaptic updates first, followed by the post-synaptic updates, thus ensuring the up-to-date status of synaptic connections.

The activity based plasticity described herein may advantageously provide a mechanism for retaining strong but temporarily inactive synapses via anti-causal potentiation. In some realizations, such synapses are retained irrespective of the activity of post synaptic neuron. Such efficacy retention mechanism may allow for long intervals (e.g., from several seconds to several minutes) between slow features that may be processed (pulled together) by the neuron. The term slow feature analysis may be used to describe features and aspects of the input that persist between consecutive presentations (frames) of the input. In one or more implementations, an input within the input frame may be regarded as a slow feature if it is detectable (with a sufficient accuracy, e.g., 75%) for many (e.g., 5-5,000 frames for a 25 fps frame rate) frames. By way of an example, for an input I containing typical video recording at 25 fps of a street and/or a room with people walking around, a function of the input f(I) may return the 'TRUE' value for input frames comprising representations of a human face; the function f(I) may return 'FALSE' for frames that do not contain a face. In some approaches, logical functions that, over a broad range of inputs (e.g. video input), may persistently provide either TRUE or FALSE response with relatively little variability (e.g., less than 10% of the frames, in some implementations when processing a typical ensemble of frames containing natural images) may be regarded as slow features.

The selectivity of the neurons receptive field is obtained by a different mechanism (the invention) where the depression is related to post-synaptic activity but only applied in the event of a presynaptic spike triggering a synapse.

Various aspects of the disclosure may advantageously be applied to, inter cilia, the design and operation of large spiking neural networks configured to process streams of input stimuli, in order to aid in detection and functional binding related to an aspect of the input.

In some implementations, the activity-based and/or plasticity modulation mechanisms described herein may be implemented in a spiking neuron of a network, or in a connection of the network.

It is appreciated by those skilled in the arts that above implementation are exemplary, and the framework of the disclosure is equally compatible and applicable to processing of other information. For example, the framework may be applied in information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the various aspects of the present innovation are useful in a variety of devices including without limitation prosthetic devices, autonomous and robotic apparatus, and other electromechanical devices requiring sensory processing functionality. Examples of such robotic devices may include manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), Lego® robotic toys, and/or other devices.

Implementations of the principles of the disclosure may be applicable to video data compression and processing in a wide variety of stationary and portable devices (e.g., for example, smart phones, portable communication devices, notebook, netbook and tablet computers, surveillance camera systems, and practically any other computerized device configured to process vision data).

Implementations of the principles of the disclosure are further applicable to a wide assortment of applications including computer human interaction (e.g., recognition of gestures, voice, posture, face, and/or other aspects), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at individual points in the image or in the 3D scene, or even of position of the camera that produces the images. Examples of such tasks may include: ego-motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system may be embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). A myriad of other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements. For example, it is to be understood that the present disclosure contemplates that, to the extent possible, one or more features of any implementation can be combined with one or more features of any other implementation. Moreover, given steps of a method may be added or subtracted, or their order of performance permuted.

What is claimed:

1. A non-transitory computerized spiking neuron apparatus comprising a plurality of computer-readable instructions configured to, when executed:
    based on a response by a neuron:
        increase efficacy of a connection configured to provide an input to the neuron prior to the response; and
        adjust the efficacy of the connection configured to provide the input to the neuron subsequent to the response;
    wherein the adjustment of the efficacy is determined based on a rate of the response by the neuron.

2. The apparatus of claim 1 wherein:
    the input is characterized by a refresh period of 40 ms; and
    the rate of the response is based on an average of the rate of responses by the neuron determined within a time window selected from a range between 1 s and 2000 s, inclusive.

3. The apparatus of claim 1 wherein:
    the response comprises one or more spikes generated by the neuron based on the input;
    the rate of the response comprises an average rate determined based on at least a number of the one or more spikes that occur within an interval;
    the increase of the efficacy is characterized by a first rule; and
    the adjustment of the efficacy comprises an increase of the efficacy based on a second rule, where a magnitude of the increase being determined is based at least on the average rate being below a threshold.

4. The apparatus of claim 3 wherein the adjustment of the efficacy further comprises a decrease in the efficacy, where a magnitude of the decrease being based on the average rate being above the threshold.

5. The apparatus of claim 4 wherein the magnitude of the decrease and the magnitude of the increase are each independent of a time interval between the response and the input.

6. The apparatus of claim 5 wherein the magnitude of the increase is configured to be smaller than the magnitude of the decrease, and the magnitude of the increase is characterized by the first rule.

7. The apparatus of claim 5, wherein:
the input is characterized by a refresh rate of 25 Hz;
the threshold is selected from a range between 0.05 Hz and 0.2 Hz; and
a ratio of the magnitude of the increase based on the second rule to the magnitude of the decrease is selected from the range between 0.05 Hz and 0.2 Hz inclusive.

8. The apparatus of claim 1, wherein the adjustment of the efficacy is based at least in part on a timer interval between the response and another response that precedes the response.

9. The apparatus of claim 1 wherein:
the efficacy increase comprises an increase of the efficacy based on a delay between the response and the input being below a threshold; and
the efficacy is maintained based on the delay between the response and the input being above the threshold.

10. The apparatus of claim 9, wherein:
the input is characterized by a refresh rate;
the refresh rate comprises 40 ms; and
the threshold is selected from a range between 500 ms and 1000 ms, inclusive.

11. The apparatus of claim 1 wherein:
the input is characterized by a refresh rate of 40 ms; and
the efficacy increase comprises an increase of the efficacy when a delay between the response and the input is below a threshold, the threshold is selected from a range between 20 ms and 200 ms, inclusive.

12. The apparatus of claim 1 wherein:
the increase of the efficacy is characterized by a potentiation interval configured so that the efficacy of the connection configured to provide the input to the neuron within the potentiation interval prior to the response is increased; and
the efficacy of the connection configured to provide the input to the neuron outside the potentiation interval prior to the response is maintained at a value of the efficacy prior to the response.

13. The apparatus of claim 12 wherein the maintenance of the efficacy at the value of the efficacy prior to the response is characterized by changes to the value of less than 0.01%.

14. A non-transitory computer-readable medium having program code recorded thereon, the program code comprising:
program code to update a connection configured to provide a stimulus to an artificial neuron, the update configured to:
when the stimulus precedes a response generated by the neuron, potentiate the connection;
when the response precedes the stimulus:
potentiate the connection when a neuron activity is below a threshold level; and
depress the connection when the neuron activity is above the threshold level.

15. The apparatus of claim 14, wherein:
the depression of the connection is configured to delay another response by the neuron subsequent to the response; and
the potentiation of the connection is configured to advance the another response.

16. The apparatus of claim 15, wherein:
the connection is characterized by a latency configured to delay a provision of the stimulus to the neuron;
the connection potentiation comprises a reduction in the latency; and
the connection depression comprises an increase in the latency.

17. The apparatus of claim 14, wherein:
the connection is characterized by a weight configured to affect generation of the response by the neuron such that a larger weight corresponds to a greater probability of the response being generated;
the connection potentiation comprises an increase in the weight; and
the connection depression comprises a reduction in the weight.

18. A method of managing a connection in a neuron network based on at least one signal from a neuron, the method comprising:
receiving at least one input via the connection;
sending the at least one signal at a time proximate to the received at least one input;
when the at least one signal is sent prior to the receiving of the at least one input, demoting the connection; and
when the at least one signal is sent after the receiving of the input, promoting the connection.

19. A sensory processing neuron network apparatus, comprising:
a neuron; and
a connection configured to provide an input to the neuron configured to generate a response based on the input;
wherein the connection is further configured to be:
potentiated when the input is within an interval from the response;
adjusted when the input occurs subsequent to the response, the adjustment being
determined based on activity of the neuron prior to the response,
wherein a neuron activity is determined based on at least a number of neuron responses within a time interval to precede a second input, the number of responses including the response.

20. The apparatus of claim 19, wherein the each individual one of the number of neuron responses comprises a spike.

21. The apparatus of claim 19, wherein:
at least a portion of a first interval corresponds to the input preceding the response; and
the remaining portion of the first interval corresponds to the input subsequent to the response.

22. The apparatus of claim 19, wherein:
the input is characterized by a refresh rate of 25 Hz; and
the interval is selected from a range between 40 ms and 400 ms inclusive.

23. An apparatus for managing a connection in a neuron network based on at least one signal from a neuron, the apparatus comprising:
a memory; and
at least one processor coupled to the memory, the at least one processor configured:
to receive at least one input via the connection;
to send the at least one signal at a time proximate to the received at least one input;
to demote the connection when the at least one signal is sent prior to the receiving of the at least one input; and
to promote the connection when the at least one signal is sent after the receiving of the input.

24. An apparatus for managing a connection in a neuron network based on at least one signal from a neuron, the apparatus comprising:
- means for receiving at least one input via the connection;
- means for sending the at least one signal at a time proximate to the received at least one input;
- means for demoting the connection when the at least one signal is sent prior to the receiving of the at least one input; and
- means for promoting the connection when the at least one signal is sent after the receiving of the input.

* * * * *

UNITED STATES PATENT AND TRADEMARK OFFICE
CERTIFICATE OF CORRECTION

PATENT NO. : 9,436,908 B2
APPLICATION NO. : 13/774934
DATED : September 6, 2016
INVENTOR(S) : Filip Piekniewski et al.

It is certified that error appears in the above-identified patent and that said Letters Patent is hereby corrected as shown below:

Claims, beginning at column 24, line 31 through column 27, line 11 should read:

1. A non-transitory computer-readable medium having program code recorded thereon, the program code comprising:
    program code, based on a response by a neuron, to:
        increase efficacy of a connection configured to provide an input to the neuron prior to the response; and
        adjust the efficacy of the connection configured to provide the input to the neuron subsequent to the response;
    wherein the adjustment of the efficacy is determined based on a rate of the response by the neuron.

2. The non-transitory computer-readable medium of claim 1 wherein:
    the input is characterized by a refresh period of 40 ms; and
    the rate of the response is based on an average of the rate of responses by the neuron determined within a time window selected from a range between 1 s and 2000 s, inclusive.

3. The non-transitory computer-readable medium of claim 1 wherein:
    the response comprises one or more spikes generated by the neuron based on the input;
    the rate of the response comprises an average rate determined based on at least a number of the one or more spikes that occur within an interval;
    the increase of the efficacy is characterized by a first rule; and
    the adjustment of the efficacy comprises an increase of the efficacy based on a second rule, where a magnitude of the increase being determined is based at least on the average rate being below a threshold.

4. The non-transitory computer-readable medium of claim 3, wherein the program code to adjust the efficacy further comprises program code to decrease the efficacy, where a magnitude of the decrease being based on the average rate being above the threshold.

Signed and Sealed this
Twenty-second Day of November, 2016

Michelle K. Lee
*Director of the United States Patent and Trademark Office*

5. The non-transitory computer-readable medium of claim 4 wherein the magnitude of the decrease and the magnitude of the increase are each independent of a time interval between the response and the input.

6. The non-transitory computer-readable medium of claim 5 wherein the magnitude of the increase is configured to be smaller than the magnitude of the decrease, and the magnitude of the increase is characterized by the first rule.

7. The non-transitory computer-readable medium of claim 5, wherein:
   the input is characterized by a refresh rate of 25 Hz;
   the threshold is selected from a range between 0.05 Hz and 0.2 Hz; and
   a ratio of the magnitude of the increase based on the second rule to the magnitude of the decrease is selected from the range between 0.05 Hz and 0.2 Hz inclusive.

8. The non-transitory computer-readable medium of claim 1, wherein the program code to adjust the efficacy is based at least in part on a timer interval between the response and another response that precedes the response.

9. The non-transitory computer-readable medium of claim 1 wherein:
   the program code to increase the efficacy further comprises program code to increase the efficacy based on a delay between the response and the input being below a threshold; and
   the non-transitory computer-readable medium further comprises program code to maintain the efficacy based on the delay between the response and the input being above the threshold.

10. The non-transitory computer-readable medium of claim 9, wherein:
    the input is characterized by a refresh rate;
    the refresh rate comprises 40 ms; and
    the threshold is selected from a range between 500 ms and 1000 ms, inclusive.

11. The non-transitory computer-readable medium of claim 1 wherein:
    the input is characterized by a refresh rate of 40 ms, and wherein the program code to increase the efficacy further comprises program code to increase the efficacy when a delay between the response and the input is below a threshold, the threshold selected from a range between 20 ms and 200 ms, inclusive.

12. The non-transitory computer-readable medium of claim 1 wherein:
    the increase of the efficacy is characterized by a potentiation interval configured so that the efficacy of the connection configured to provide the input to the neuron within the potentiation interval prior to the response is increased; and
    the efficacy of the connection configured to provide the input to the neuron outside the potentiation interval prior to the response is maintained at a value of the efficacy prior to the response.

13. The non-transitory computer-readable medium of claim 12 further comprising program code to maintain the efficacy at the value of the efficacy prior to the response, wherein the maintenance of the efficacy is characterized by changes to the value of less than 0.01%.

CERTIFICATE OF CORRECTION (continued)
U.S. Pat. No. 9,436,908 B2

14. A non-transitory computer-readable medium having program code recorded thereon, the program code comprising:
    program code to update a connection configured to provide a stimulus to an artificial neuron, the update configured to:
        when the stimulus precedes a response generated by the neuron, potentiate the connection;
        when the response precedes the stimulus:
            potentiate the connection when a neuron activity is below a threshold level; and
            depress the connection when the neuron activity is above the threshold level.

15. The non-transitory computer-readable medium of claim 14, wherein:
    the depression of the connection is configured to delay another response by the neuron subsequent to the response; and
    the potentiation of the connection is configured to advance the another response.

16. The non-transitory computer-readable medium of claim 15, wherein:
    the connection is characterized by a latency configured to delay a provision of the stimulus to the neuron;
    the connection potentiation comprises a reduction in the latency; and
    the connection depression comprises an increase in the latency.

17. The non-transitory computer-readable medium of claim 14, wherein:
    the connection is characterized by a weight configured to affect generation of the response by the neuron such that a larger weight corresponds to a greater probability of the response being generated;
    the connection potentiation comprises an increase in the weight; and
    the connection depression comprises a reduction in the weight.

18. A method of managing a connection in a neuron network based on at least one signal from a neuron, the method comprising:
    receiving at least one input via the connection;
    sending the at least one signal at a time proximate to the received at least one input;
    when the at least one signal is sent prior to the receiving of the at least one input, demoting the connection; and
    when the at least one signal is sent after the receiving of the input, promoting the connection.

19. A sensory processing neuron network apparatus, comprising:
    a neuron; and
    a connection configured to provide an input to the neuron configured to generate a response based on the input;
        wherein the connection is further configured to be:
            potentiated when the input is within an interval from the response;
            adjusted when the input occurs subsequent to the response, the adjustment being determined based on activity of the neuron prior to the response.

wherein a neuron activity is determined based on at least a number of neuron responses within a time interval to precede a second input, the number of responses including the response.

20. The apparatus of claim 19, wherein the each individual one of the number of neuron responses comprises a spike.

21. The apparatus of claim 19, wherein:
   at least a portion of a first interval corresponds to the input preceding the response; and
   the remaining portion of the first interval corresponds to the input subsequent to the response.

22. The apparatus of claim 19, wherein:
   the input is characterized by a refresh rate of 25 Hz; and
   the interval is selected from a range between 40 ms and 400 ms inclusive.

23. An apparatus for managing a connection in a neuron network based on at least one signal from a neuron, the apparatus comprising:
   a memory; and
   at least one processor coupled to the memory, the at least one processor configured:
      to receive at least one input via the connection;
      to send the at least one signal at a time proximate to the received at least one input;
      to demote the connection when the at least one signal is sent prior to the receiving of the at least one input; and
      to promote the connection when the at least one signal is sent after the receiving of the input.

24. An apparatus for managing a connection in a neuron network based on at least one signal from a neuron, the apparatus comprising:
   means for receiving at least one input via the connection;
   means for sending the at least one signal at a time proximate to the received at least one input;
   means for demoting the connection when the at least one signal is sent prior to the receiving of the at least one input; and
   means for promoting the connection when the at least one signal is sent after the receiving of the input.